United States Patent [19]
Dunn

[11] Patent Number: 5,659,596
[45] Date of Patent: Aug. 19, 1997

[54] SYSTEM FOR LOCATION OF COMMUNICATION END USERS

[75] Inventor: James M. Dunn, Ocean Ridge, Fla.

[73] Assignee: International Business Machines Corporation, Armonk, N.Y.

[21] Appl. No.: 421,054

[22] Filed: Apr. 12, 1995

[51] Int. Cl.⁶ .................................................... H04Q 1/00
[52] U.S. Cl. ........................... 455/456; 455/432; 455/461
[58] Field of Search ........................ 379/58, 59; 455/33.1

[56] References Cited

U.S. PATENT DOCUMENTS

| | | | |
|---|---|---|---|
| 4,398,063 | 8/1983 | Hass et al. | |
| 5,101,501 | 3/1992 | Gilhousen et al. | 455/33.1 |
| 5,150,362 | 9/1992 | Akerberg | 270/95 |
| 5,153,902 | 10/1992 | Buhl et al. | 379/57 |
| 5,159,625 | 10/1992 | Zicker | 379/59 |
| 5,210,787 | 5/1993 | Hayes et al. | 379/60 |
| 5,212,822 | 5/1993 | Fukumine et al. | 455/33.1 |
| 5,222,249 | 6/1993 | Carney | 455/33.2 |
| 5,255,307 | 10/1993 | Mizikovsky | 379/58 |
| 5,307,400 | 4/1994 | Sawyer et al. | 379/59 |

FOREIGN PATENT DOCUMENTS 0454647  10/1991  European Pat. Off. .

OTHER PUBLICATIONS

Ito, "System Design for Portable Telephones: Methods to Enable Initiating and receiving Calls from a Vehicle", 39th IEEE vehicular Technology Conference, pp. 136-141 May 1989.

Kanai, Taketsugu, Kondo, "Experimental Digital Cellular System for Microcellular Handoff", IEEE Jan. 1990.

Chia, Warburton, "Handover Criteria for City Microcellular Radio Systems", IEEE Jan. 1990.

*Primary Examiner*—William Cumming
*Attorney, Agent, or Firm*—Barry L. Haley; George E. Grosser

[57] ABSTRACT

A system for location of communication end users including a plurality of wide area networks which control the transmission of voice, data, file and other types of messages in a preconfigured exchange area, each area network including a plurality of local servicing offices controlled by a central regional service point wherein the local servicing offices track, monitor and receive user specific information from users within their designated area and which respond to search requests from the regional service points, the regional service points providing an interface to other wide area networks for complete global communication and location of communication end users. The local servicing offices and regional service points are computer based systems controlled by microprocessors and having databases for permanently and temporarily storing predetermined end user information and messages from and intended for selected end users, whereby the local servicing offices and regional service points communicate with each other and with other wide area networks via a physical communication network which provides communication links between the networks and the end users whether wireless or wired.

13 Claims, 10 Drawing Sheets

*PRIOR ART*

*PRIOR ART*

SYSTEM FOR LOCATION OF COMMUNICATION END USERS

BACKGROUND OF THE INVENTION

1. Field of the Invention

This invention relates to wired or wireless communication networks, such as, cellular mobile radio system networks and, more particularly, to locating mobile end users, or subscribers, and routing messages to such cellular subscribers as they roam between communication networks such that voice, data or mail messages follow them or locate them automatically within such networks without the originator having to know the address location of the target user, the type of device, or the network involved, or without the target user having to initiate the retrieval of the message.

2. Description of the Background Art

In order to present a complex example, a wireless network using cellular technology is described. The invention is not limited to wireless or cellular networks, but could be used in any network where the interconnecting, or intermediate, office can communicate with both an end user and the overlaying logical network. The logical network is the controlling entity that dictates message routing and form, and directs originating messages to their intended target based on end user inputs. The logical network is typically computer based and may be defined by a local or private company network which interfaces with a regional communication carrier, e.g. BellSouth®, or by a private network service. Cellular communication is just one type of wireless network technology that utilizes and partitions available frequency bands into cells for transmitting messages, such as voice and data. Accordingly, other wireless communication networks are available that utilize available frequency bands in schemes other than cellular for the wireless transmission of messages.

Radio telecommunication, such as cellular, is a portable or mobile communication system employed by telephones, computers and facsimiles for interacting with existing telephone systems so that mobile users may communicate with other radio devices and with standard wireline telephones, facsimiles and computers. A networking technique is employed in cellular communication which includes covering entire countries or large regions with a system of radio telephones that broadcast over available frequencies on a frequency band around 900 MHz. These cellular radio networks are a mixed system wherein they simultaneously broadcast analog voice and data signals, and digital control signals to use available frequencies more efficiently. With reference to FIG. 1, in individual cellular radio networks a country or region is divided into a collection of cells 4 for frequency management, wherein each cell is approximately three miles thick and has its own radio transmitter or transceiver 3. Each radio transmitter is controlled by a mobile telephone serving office (MTSO) 1 including a central mobile switching computer which directs calls to the intended target device. With reference to FIG. 2, as a cellular communication device, or remote subscriber unit (RSU) 5, travels between cells a "handoff" of broadcast operating frequencies is performed by the MTSO 1 central computer so that the MTSO 1 can maintain a communication link with the RSU without jamming the frequencies or causing channel chatter. Each cell in a cellular network exchange is illuminated by radio transmissions from a particular MTSO base station covering that cell for communicating with RSUs in that cell. An MTSO is defined by a mobile switching center for accessing subscriber unit data information. The MTSO thereby controls the radio linkages between different MTSO base stations and their associated cells 4 covering a given geographic area. Thus, each cellular exchange or system 2 is comprised of one or more MTSO base stations and their MSCs which serve the RSUs within a particular geographic area.

Referring to FIG. 2, in a conventional cellular communication network when the RSU is the originating cellular device, or RSUO 5, the cellular message is transmitted from the RSUO 5 as an analog signal to the cell transmitter 3 in the originating cell. The message is transmitted to a target transceiver 3 and eventually sent along conventional telephone lines to the target exchange, or MTSO. The MTSO typically converts the message to digital for switching and sending the message to the correct target destination. After switching, the signal may be reconverted to analog for airlink transmission or remain digital and sent along telephone lines. It should be noted that a similar, but reversed, path is followed when the originator is a wireline device calling a cellular target, or RSUT 6, whereby the signal is first sent through the direct lines and then transmitted from a transceiver to the target RSUT 6. If the target device is a conventional wireline phone or computer 6a, then the message continues along the carrier telephone lines, such as a regional bell operating carrier or private data service 8, to the wireline target. On the other hand, if the target device is also a cellular RSU, RSUT 6, then the message is sent to the MTSO radio transmitter for transmitting to the target cell transmitter 3 and target RSUT 6.

When the cellular RSU leaves its registered calling area or MTSO exchange, the device is said to be roaming. When roaming, it is desirable to provide telephone or communication service to the RSU to allow the RSU to originate calls to other RSUs or wireline subscribers, or to receive communications from other subscribers. Roaming is a conventional technique in which an RSU may be tracked to any MTSO exchange or geographic communication area outside its home MTSO. Exchanges outside the home exchange are known as visited exchanges. Roaming allows any cellular user to access the cellular radio system from any visited exchange in the country via different networks. However, when roaming a RSU must register with the visited exchange for tracking and identification purposes. An RSU may pre-register with a predetermined visited exchange before entering that exchange or may be configured for automatic registration whereby RSU identification codes are automatically transmitted and recognized by the visited MTSO. Additional fees are often incurred by an RSU end user when roaming because MTSO exchanges often charge a visitor for registration, for tracking and the number of communication links that must be made.

Based on the above-noted, current cellular communication systems may be described as comprising physical cellular networks and logical networks. Although cellular networks may be broken down into the physical and logical world, both the physical cellular network and logical networks overlap and work hand in hand, as noted above. For example, the MTSO exchange maintains a home location register (HLR) typically defined by a computer for mapping phone numbers with device serial numbers. Therefore it may be categorized into both the physical and logical world. At the same time, however, both the physical cellular network and logical networks perform distinct functions in today's technology. The physical network comprises conventional wireline and cellular radio telecommunication connection systems, such as those operated by large phone carrier service corporations, to transmit either voice or data-type messages between end users over communication cables, fiber optics or air-link channels. The physical cellular network may route voice or data message between an originating fixed or wireline connected communication device, such as a telephone, a computer having a modem, or a facsimile, and an RSU, such as a cellular phone, portable computer with cellular communication capabilities or portable facsimile, or between two mobile devices, such as those noted above. The physical cellular network establishes communication links between end user devices through direct physical links, such as PSTN, and air links, such as CDPD, based on a specific device address and current location that appears to be "fixed" (immobile) to the physical network on each end at any given instant. Regarding air links, the cellular RSUs in the mobile subscriber networks maintain communication with one another and with direct line devices connected to the PSTN or CDPD by virtue of radio links. In the past, the PSTN networks were merely used by telephone companies to establish direct telephone connections over wireline systems. More recently, CDPD networks have been employed, especially in computer to computer communications for sending voice and data messages in digitized data packets over airway transmissions accessed through a wireline gateway computer.

The logical networks comprise public and private logical control systems which are manipulated by end users to select a desired operating function and target address for transmitting or receiving desired messages or for temporarily registering with new networks when roaming. The logical networks typically in place cooperate with the physical networks to direct calls or messages and to establish telecommunication links between subscriber end-users whether RSUs or fixed line devices. Conventional logical networks include home location registers (HLR's) and visitor location registers (VLR's), i.e. the MTSO, which store or maintain a register of electronic serial numbers (ESN's) of mobile devices (RSUs) registered in the corresponding network and of those mobiles roaming the network exchange that automatically register or pre-register. The ESN is the identification number of the device only and it is transmitted over a control channel. The HLR and VLR is nothing more than a computer database. Essentially, when an originator dials a target's phone number the originating ELR correlates the phone number with the ESN based on a logic map and then locates that ESN through the physical network. If the ESN is not located in the boundaries of the current cellular network then the originating HLR must ask other VLR's of other networks if they have the target ESN. If a target VLR has the target device then it either authorizes or does not authorize the call depending on factors such as payment history or current registration status. Therefore, with present technology, cellular communications between different carriers or network must pass through an originating device's own operating logical networks as well as the cellular target's operating logical network before reaching the target RSU. This is because under current telecommunications technology, a "phone number" specifies a "route" to a device. As a user "roams," the "route" must be flexible. The ESN and HLR/VLR databases are used to give flexibility to the route. Each time an HLR responds to a request it charges the requesting VLR which, in turn, passes the cost down to the users regardless of whether an authorization is made. In addition, the originating user is limited to finding the target device rather than the actual user.

Each mobile subscriber, or RSU, is associated with a particular home MTSO and an HLR. The home network has registers which maintain records of all relevant information associated with the mobiles, including the type of telephone service and options they have been programmed to receive. For example, a home network stores a mobile subscriber's mobile identification number ("MIN") along with its electronic serial number ("ESN") identifying the particular mobile instrument for determining the categories of service which it is contracted, e.g., call forwarding, call waiting, long distance calling in areas, originating features to selected exchanges, and other subscriber specific information. When the RSU is operating within its own network, i.e., geographic area, and calls are being handled through its home MTSO, all of this information is available in the HLR and is used by the MTSO in handling telephone traffic between base stations and with the target mobile. The MIN and ESN's are transmitted over a control channel for identifying the device and is subsequently used for handling billing. These identification numbers, however, do not identify the actual user. Therefore, the devices may be fraudently used. In addition, originators can only locate and route messages to the target device and not necessarily their intended target user. There is essentially a gamble that a transmitted message from the originating device will ever reach the user. In addition, if a target device is not enabled then the message has no way of automatically reaching either the target user or device. Although the home HLR records the last known geographic exchange location of the mobile, the last known location of the RSU is useless when power is off since location changes and a directed call going through the physical cellular network and logical networks of both the originator and target devices (i.e. RSU) may have changes imposed. In addition, storing the last known location of the RSU does not enable the routing of messages to the RSU target user once the user is activated.

The location registers of each cellular network, as defined by the MTSO 1 of FIGS. 1 and 2, communicate and request user specific information from other HLR's and a visiting device seeks temporary registration in the network. The home HLR 4 device stores the devices MIN and ESN numbers and cell location information of RSUs, while the peer VLR's store temporary device and location information of RSUs currently visiting the exchange. The information requests from or between location registers includes the user ID, MIN and ESN codes, and whether that device is currently registered with its home HLR or the contacted HLR and if it is authorized to make calls or is temporarily registered and located in that network. Each time a home or peer HLR of a network responds to information requests the responding network charges the requester. The same problems exist when calling from an RSU to an RSU number outside the home network because the home carrier network, typically a regional bell operating carrier (RBOC) has to go through a long distance carrier service, as seen in FIGS. 3 and 4, to make a communication link. And, before that link is established the HLR's must compare the phone number dialed to the target device MIN and ESN numbers to find the device. Once again, it is more expensive than conventional direct line calls and requires time and requests response sequences to find the target device; not necessarily the user. RBOC's cannot carry long distance traffic. Therefore, they must use long distance carriers which eventually link to the corresponding or responding networks for user traffic, and a separate network for signaling (HLR/VLR) traffic. The present invention, therefore, provides "middle man" devices which temporarily store device and device location information, user identification information, and user traffic transport and data information. This information is made available to any requesting control office or port when the originator originates a call through an initiating service office.

Polling describes tracking schemes used for maintaining communication between roaming RSUs and cellular communication system networks, or MTSO's. In polling schemes, each RSU periodically receives a signal referred to as a system identification number (SID) in North American cellular systems, from a MTSO base station which includes data information that identifies the particular polling scheme and base station with which the RSU is in current radio contact. The RSU in turn responds to the periodic signals transmitted from the base stations by transmitting its MIN and ESN back to the base station for temporary registration with it as a user. The receiving MTSO records an indication of the presence of the RSU in the visited exchange area inside a memory location. This informs MSC base stations in the geographic exchange area of the presence of the RSU within its coverage area at that particular moment. Cellular systems can only trace an enabled device, not the user, and the device must be in some way registered each time to be recognized. There are basically three ways in which an RSU may register with a base station. The first is an autonomous registration which is used in response to the RSU entering a new exchange area. The second way a RSU registers is by a periodic registration which is typically in response to the passage of time elapsing since the last or previous registration. And, the third registration scheme occurs while originating a call or message transfer from the RSU in response to an unregistered RSU seeking to originate a call, or establish a communication connection. In either event, any calls or messages looking for the device must be verified by the visited HLR and authorized by the home HLR. An authorization is not guaranteed, takes time and is costly. Some solutions suggest registering with a number of MTSO's. This, however, does not eliminate the problem of tracking users, finding disabled devices when a message is originated and alleviating the high cost associated with responding HLRs.

Thus, as a cellular user travels with their cellular phone on, the phone reports itself to every cell it passes and to MTSO base stations as it changes networks. So at a physical level the network knows the phone's cell location. However, at the logical and physical level the cellular network system, does not necessarily know the location or identity of the target user and if the target device is off at the time a message is originated, the message may never be received. So messages may or may not reach the user. Moreover, current environment logical networks require active users to directly interface with the logical network via the communication devices, i.e. phone or modem interface, to retrieve or forward messages. For example, in cellular communication devices having auxiliary features such as call forwarding, electronic mail, facsimiles or other data retrieval features, the target end user has to pre-program their phone or modem based communication device to direct calls to a desired target address, keep their communication device powered, and remain within the required calling area of the cellular target device. In phones having call forwarding features the user must reprogram the phone to forward calls to a preestablished phone address. Although a caller may establish a connection with a cellular phone user with call forwarding, they cannot necessarily transmit messages, and once the cellular phone is powered down, then the originating end user has no way of determining the cellular user's location. In other words, the present cellular telecommunication systems do not have the ability to locate or monitor the location of remote cellular users for routing or transmitting messages, or for automatically transmitting messages once a location is known.

Accordingly, there remains a need for a cellular mobile radio system or network that locates cellular subscribers, and which can automatically route messages to remote subscriber users without the originator having to know the address location of the user or the type of target device being used, or the target user having to initiate the retrieval of the messages. Although there exists systems in the background art which maintain or store the location of cellular devices, those systems known in the background art do not address these problems noted by the present invention. For instance, Hayes et. al., U.S. Pat. No. 5,210,787, discloses a subscriber interrogation point system for use in cellular networks that maintains a database of home exchange locations for mobile subscribers and that communicates this information to mobile switching center exchanges visited by the mobile subscribers to simplify database maintenance. The subscriber interrogation points store in memory information associated with each mobile subscriber identifying either the home exchange of that particular subscriber or other subscriber interrogation points able to identify such home exchanges. Thus, Hayes, et al provides an address resolution scheme for managing database information relevant to mobile subscribers thereby keeping a map of devices in its area. Unlike the instant invention, Hayes et. al. updates geographic locations of mobile devices and visited exchanges, updates the mobile device's home exchange, authenticates the mobile device as being capable of receiving service from the visited exchange and obtains information as to the detail service specifications which the visiting mobile subscriber is to receive. Thus, Hayes et. al. maintains a database of device specific information. Hayes et. al. does not provide a "find me" technique applied at the logical level for automatically locating users and routing messages, whether voice or data, to the users of remote subscriber units as they roam between networks. By contrast, the instant invention incorporates regional and local offices in a fully meshed communicating network which locates end users and routes messages to the user of a device independent of the actual device being used without the actual target user and originating user having device specific information related to each other.

Other devices and systems noted in the background art include U.S. Pat. No. 5,153,902 issued to Buhl et. al., U.S. Pat. No. 5,255,307 issued to Mizikovsky, U.S. Pat. No. 5,150,362 issued to Akerberg, U.S. Pat. No. 5,307,400 issued to Sawyer et. al., U.S. Pat. No. 5,212,822 issued to Fukumine et. al. and U.S. Pat. No. 5,222,249 issued to Carney. Buhl et. al., in U.S. Pat. No. 5,153,902, discloses a multi-exchange paging system for locating a mobile telephone in a wide area telephone network. The disclosure of Buhl et. al. describes a method of optimizing a sequence of areas a poll is sent to find the physical communication device. Unlike the present invention, Buhl et. al. assumes a predetermined list of areas. By contrast, the instant invention addresses the way a logical network is traced to find a logical subscriber and provides a system that searches a network in a novel, optimal way using pre-existing physical network polling techniques at the physical level. Mizikovsky, U.S. Pat. No. 5,255,307, discloses a status indicator control for cellular mobile telephone systems which provides a HOME indication when the mobile is in its home system and a ROAM indication when the mobile station communicates with a base station in a visited system whereby the particular indication is dependent upon the system identification data received from the base station. Thus, Mizikovsky teaches a method to allow the HOME/ROAM indicator to be controlled programmatically and it allows for the indicator to be changed when the phone is in an active mode and when the protocols are changed between home and roam. Akerberg, U.S. Pat. No. 5,150,362, discloses a beacon carrier which assigns time slots or channels to a mobile unit after the mobile unit and relevant base station have established communication, that is, have found each other. Sawyer et. al., U.S. Pat. No. 5,307,400, teaches call routing in mobile telephone systems whereby a mobile unit initiates a communication contact and registration process. In Sawyer et. al., a visiting mobile subscriber sends a registration access, the visited system acknowledges the registration, records the mobile subscriber's presence and signals the mobile subscriber's home system of the mobile's presence. Thus, Sawyer et. al. initiates the communication link with the visited exchange and the registration process. By contrast, the instant invention provides a logical network system and method that communicates with regional and local offices or nodes that are able to find mobile cellular users and automatically transmits messages to the users through the logical network. Fukumine et. al., U.S. Pat. No. 5,212,822 discloses a method for registering mobile stations in mobile communication systems by pointing a mobile unit to a preferred base station when an overlap exists between stations within the same communication network. Carney, U.S. Pat. No. 5,222,249, discloses a method and system for providing dynamic RF communication resources to a mobile unit as that mobile unit changes geographic areas such that RF communication resources used by that mobile unit are not forcibly terminated as that mobile unit roams. Carney, therefore, teaches a method for channel reassignment during handoff that attempts to insure channel resources will be available at the target cell by tracking the mobile unit and anticipating cell boundary crossings. Although today's cellular telecommunication systems can locate a cellular device and establish a physical cellular network link, the logical networks and their interaction with the physical networks is very limited. More specifically, conventional cellular communication systems can only locate the cellular device and not the actual user, they cannot forward messages to cellular target devices without inputs from the target end users, messages cannot be automatically forwarded to a cellular target device without the target user calling into their home location to initiate the process, direct connections cannot be directly established between cellular users of different carriers, and a cellular target user is not able to authorize, or filter, messages that are allowed to find the target device. Moreover, the carriers do not know the location of their remote cellular end users until the actual user turns on their power, after which the carrier must search for the user in a hierarchy priority search. The present invention represents a novel logical network system for use with existing physical cellular networks and a method which automatically interfaces the new and existing logical networks, such as International Business Machine's (IBM®) Intelligent Communications Systems (ICS) (trademark of IBM®), with remote subscriber units, or targets, through the physical network and routes messages to the actual user of the target RSU instead of just the device and which may store messages for target users whose location may be unknown when messages are originated and automatically transfer the message to the target user when they are relocated and activated.

SUMMARY OF THE INVENTION

It is an object of the instant invention to provide a network system for locating mobile users that finds a user independent of the actual remote subscriber unit scheme, or the attachment or carrier device.

It is also an object of the instant invention to offer a substantially fully meshed system comprising control networks having a plurality of local service offices and a corresponding control regional support office, such that every communication control network is connected to every other communication control network whereby all servicing offices in a given network are interfaced to each other and to the corresponding regional support office, and whereby each network regional support office is likewise interfaced.

It is another object of the instant invention to provide a mobile network system that locates mobile users and that operates completely independent of the polling or roaming schemes.

It is a further object of the instant invention to provide a mobile user location system that transmits logical messages to the mobile users and that reaches out and finds the target end user. It is yet another object of the instant invention to provide a mobile user location system that allows remote subscriber unit (RSU) devices to report back to the logical network and home station via the physical network in place so that the home station knows the location of the RSU or most recent location of the RSU at all times and the relevant time stamps.

It is yet a further object of the instant invention to provide a mobile location system network that reaches out to a mobile user to deliver a real time or stored message over an access network link, that allows a user to authorize or filter the messages that are able to find them, and that performs finding, routing and delivering of messages automatically without the involvement of either the originator or target user other than dialing a known phone number.

The objects of the instant invention are accomplished by a mobile location network system comprising a logical network which works in conjunction with existing physical mobile networks. The logical network of the instant invention works in conjunction with and is compatible with existing physical networks but the logical network and physical networks overlap whereby one requires interaction with the other. The physical mobile networks or regular networks provide the actual communication links between end user devices whether it be airlinks, or direct wireline links through CDPD, PSTN or other communication connection systems. The logical network performs decision making functions and memory functions to locate end user devices, initiate communication links between end user devices, store target device and user identification and location information, and to route messages from an originator to the target based on the database of memory information identifying and locating the actual target. Therefore, while the logical network may be thought of as the software side of the driving force, it includes actual communication links in a fully meshed system and works hand in hand with the actual physical network that ultimately establishes the communication link between the target device and the logical network.

The logical network of the instant invention provides a plurality of peer wide area networks (WAN's) that directly communicate with each other in a substantially fully meshed system and which establish communication links with roaming or visiting remote subscriber units (RSUs) and wireline subscriber units (WSUs) when within one of the WAN networks. The WAN networks are fully meshed so that if an originating device is seeking an RSU target device and each of the end users is in a separate WAN, the WANs directly communicate to find the target RSU so that messages may be routed from the originator to the target RSU in a system which is virtually invisible to the end users. That is, if a target device RSU is to receive a message from an originator, the user of the target RSU does not have to perform any function wherein the message finds the user. In addition, the originator only has to dial the known phone number of the target, while the WANs do the actual work in locating and identifying the intended target user. Another important aspect of the instant invention is that the messages find the user and not necessarily the devices whereby it is the target end user that is ultimately to be the recipient of the message transmitted from an originator. Therefore, the instant invention provides a system for receiving and storing device specific identification information, user identification information and user location information. Transmitted messages may also be stored temporarily.

The user, device and location identification information from an RSU is tracked by each WAN as the RSU travels in a WAN's exchange area. Each RSU when traveling in any WAN beacons its identification information, location and user IDs to the closest or controlling transceiver when wireless, or dials into the controlling network when wireline connected. This information is temporarily stored by the local controlling offices in the WAN when the RSU is within a local office's exchange so that this information is available when a message needs to be routed from either the target RSU's message box or from the originator in real time. Each WAN comprises a plurality of local service office (LSOs) and one central control regional service point (RSP) for controlling and communicating with the LSOs. The LSOs communicate with wireless RSUs traveling within their coverage area or exchange via transceivers linked to the LSO's. Meanwhile, wireline subscriber units (WSU) communicate directly through the network with the LSOs. Each LSO has at least one transceiver for receiving and transmitting messages between itself and wireless RSUs. The LSOs are preferably directly linked to outside communication networks for receiving and temporarily storing WSU subscriber IDs and device IDs. Each LSO interacted with also receives and stores RSU device identification codes, such as the MIN and ESN, the current control channels which the RSU is operating under, the RSU device identification or specification codes identifying the type of device being used and more importantly, the user identification code. Thus, the instant invention provides offices which store both wireless and wireline devices and user data.

The LSOs and RSPs are able to store predetermined end user information, in the form of user end device identification codes and location address codes because they are computer based devices which provide a database for storing such information and a microprocessor for controlling the storage and retrieval of this information. In addition, the LSOs and RSPs temporarily store transmitted messages from an originator end user until the target end user is located so that the originator is free to perform other functions independent of their transmitted message. In this way the originator only has to dial the phone number and send a message and be done with the transaction. The interaction between the end users and the wide area networks is done primarily through the transceiver and LSO. The RSPs provide central points for retrieving information from the LSOs based on requests from peer LSOs, peer RSPs and peer RAMs. For instance, the RSP may request the LSO to check its database for a specific target user and provide its location so that this information may be provided to a requesting party in another WAN or under the control of another LSO. Once the RSP has this information on the target end user it can transmit the location of the target end user to the originating LSO. Afterwards, the originating LSO can directly transmit the message to the target end user or to the target end user's controlling LSO which may either transmit it to the target end user or the target end user's home message box depending on the present codes provided by the target end user to identify its preferred transaction activity.

The user location and identification code is stored in the LSO so that a message can find the user via the user's device at the time and the location stored in the LSO. Each LSO is directly linked to their controlling RSP so that they may communicate through the RSP to find the LSO that may currently have a terminating or target RSU in their coverage or exchange area when requested by the controlling LSO for the originating RSU or WSU. The RSP, as the central or controlling service point in a WAN, may maintain a database for temporarily storing RSU or WSU information, user identification data fed to it by the LSOs, and information on which LSO is currently controlling or most recently controlled the RSU. The RSP also provides services beyond those contained in their local LSO. The local LSO maintains a database of all active RSUs within its area for self and RSP retrieval. The RSP may maintain a similar database. In this way a central point in the WAN is able to monitor the location of the RSUs in its network so it may provide the location and device information to requesting LSO's within its network or to requesting RSP's in other WAN's that request such information. Preferably, peer WANs request target user, device and location information via their controlling WANs whereby the RSPs interface with each other and then with their LSOs in a proficient hierarchy manner. Thus, both the LSO's and RSP's are computer based systems with communication capabilities for communicating with each other and other networks. Therefore, they not only have controlling software, controlling processors, memory and database files, but modems, servers, or other communication means for directly communicating with each other over communication lines.

The RSP's for each WAN communicate with each other so that information may be exchanged between the networks to help locate target RSUs when a message from either a message box or originating device is seeking the target device user. The information stored in the RSP's and LSO's and the interaction between the service offices allows the location and transmission of messages to target users to be done invisible of the originator requesting the routing of the message to the target or message box. Therefore, the originator merely has to dial a phone number of the intended target user and send the message from its communication device. Thereafter, the logical network system routes the message to the user and converts the message so that it is compatible with whatever device the user is currently logged into. If the device is one that is not adaptable for receiving the message in its transmitted form then the message is routed to the target user's home location message box and a subsequent confirming message is sent to the originator and to the target user informing the end users that the message has been stored for retrieval. If possible, however, the RSP/LSO combination may convert the message to a form that is receivable by the target RSU or WSU being used by the target user. Accordingly, the RSP's, and possibly the LSO's, may have conversion software which converts messages to a form compatible with the target device being used by the target user. In addition, the RSP's, and possibly the LSO's, provide software and databases for matching the phone number dialed by the originator with the identification codes of the user and target devices so that the message can find the target user independent of and without the need for end user input and interactions with the logical network system. All this is done without any further action by the originator because the originating LSO is able to temporarily store the message while it conducts the search for the target.

In short, once a message is sent it either finds the target user or the target user's message box allowing the target user to either receive or know the message without having to do anything. Thus, unlike the background physical networks discussed, the instant invention responds to the actual user input for routing messages to the user instead of the actual devices. In addition, the logical network of the instant invention provides regional service points which may be adaptable for communicating directly with various carriers and networks, such as regional bell operating carriers or private networks as used by large corporations on the Internet, for example. As noted in the background discussion, different carrier networks are typically incompatible for communicating directly and if possible they require complex routing through the physical networks and logical networks and conversion for passing through gateways before ever reaching a target device. That is, each network typically has a gateway for allowing entry, wherein all communication beyond the gateway int he network is in a language that is network specific. Moreover, present networks as operated by regional bell operating carriers are not able to carry long distance services. Therefore, a central HLR database cannot be used for routing long distance messages cheaply and efficiently. That is, regional bell carriers must go through long distance services to route long distance messages and must find the remote cellular devices by requesting searches and information from other HLR/VLR control stations or databases. With the instant invention, the user, device and location identifications can be retrieved from regional service point offices to allow communication between different regions, no matter how remote, without the expense and inefficiencies of present systems. In addition, since the present logical network system is user specific the messages are actually routed to the users rather than devices so that the user is insured of receiving the message, thereby protecting against piracy.

As noted above, the logical network system of the instant invention is flexible whereby phone number and identification code matching may be done by either the RSP's or the LSO's. The present system is also flexible because the RSP's are essentially self-operable within each WAN, in communication with RSPs of other WANs, and directly linked to each of their LSO's within the WAN so that a request for a communication link with a target user location and device, and other information is no more than one or two steps away. Furthermore, the RSP's for each WAN, no matter how distant, are able to communicate directly between themselves for efficiently locating the target user intended to receive a message without the cost of having other network HLR's, or VLRs, search for the targets in their exchange in response to requesting HLRs. Since a centrally located and operated HLR is not possible and would be at best inefficient given the amount of cellular and mobile communication traffic known today, the instant invention provides an efficient management system for managing cellular and mobile communication in and between different regions and networks without the cost of known systems.

The instant invention has four possible modes of operation, that is, normal flow where the target is found, normal flow where the target is not found, normal flow where there are multiple "found" active locations and normal flow multiple prior locations. Typically, a wireline device does not need to be located. However, if it is off line, then once it is back on line, the LSO will follow the sequence of events hereto. For instance, a portable computer may be moved from one location to another. In a normal flow of message routing and target finding events, the target (RSU or WSU, interchangeably SU) is first located and then the message is sent. In a first step, as a user travels within a WAN, if the target's modem is enabled, the target device responds to MTSO broadcasts identifying itself. If located by the MTSO of the physical network, the MTSO notifies the LSO of the current exchange area. The LSO records the location of the target and the target identification information. The LSO does not propagate this information to any other network element until requested. In the case where the modem of a target SU is not enabled, nothing happens and the LSO is not made aware of the target SU's presence in the exchange. In the case where the user of the target SU logs on to the current network, the LSO notifies its controlling RSP which updates the user's message box of his current location. This is always done as soon as possible because by logging on, the user is preparing to communicate. Updating the message box, however, is not necessarily of highest priority since it is merely an administrative update. If the target user does not log on to the network and an originator wants to transmit a message, then the originator sends the message to its LSO which sends it to the target user's home LSO. Subsequent to sending the message to the home LSO of the target user, the originating LSO searches its own database to see if the target user is within its exchange. It is important to note that at this point the originator does not have to perform any other functions to have their message routed to the target user or to the target user's message box. If the originating LSO does not have the intended target user then it will request the location of the user from its controlling RSP which then sends out location search requests specific to the target user. However, if the RSP of the originator has the address, it responds to the home LSO of the originator with that information so that the message may be transmitted from the originator. Otherwise, the RSP will ask the peer RSP's that own the target's home LSO with the target user's message box for the current location of the target user. The target's home RSP and LSO store and communicate with the message box and therefore provides its location when requested.

The message box as noted above is continuously updated with the most recent location of the target user. After the target's home message box responds with the target's last known location, thereby notifying the target's controlling RSP, the controlling RSP returns this location to the originating RSP. By referring to the message box, the most likely WAN in which the target user may be found is efficiently honed in on for finding the target user.

The originating RSP through which the originator is attempting to route its message establishes a communication link with the last known target controlling RSP and asks whether that RSP still has a link with the requisite target user and if the target device is enabled to receive a message. Since the RSP of any network is updated anytime there is user activity by the SUs within its network, the RSPs within each network maintain substantially current location and user identification information. Therefore, the identified RSP with the highest potential link to the target user requests the target LSOs in its network to respond with any required information. If the target user is enabled and within the control of a target LSO, the target LSO responds back to its controlling RSP which responds back to the originating RSP with target location, user and device information. The controlling RSP identified updates the target user's home RSP and message box with the current target location through the target RSP. The controlling RSP also updates the originating RSP which updates the originating LSO with the information on the target user and device. The originating RSP thereby updates the originating LSO with the target address and a message is thereafter sent to the target user. Otherwise, the message is routed to the target user's message box if such a class of service is allowed.

In a normal flow of events where a target is not found the initial steps as noted above are followed. That is, if the SU is an RSU device, it responds to MTSO broadcasts identifying itself and its location which is stored in the corresponding LSO. If the SU is a WSU, then it identifies itself and its address location when enabling or logging onto the network. In addition, once the target device is used the controlling RSP of the LSO and users message box are updated with the target user information. Also, as before, if an originator wants to route a message to a target user it dials a number and sends a message. The originating LSO then searches its database for the target user and if it doesn't have it then the originating RSP controlling that originating LSO searches its database. If the originating RSP does not have information related to the target user and its location in its database then it begins asking the peer RSP that owns the target user's home LSO and message box for the current target location. If this fails, the originating RSP will then ask the other peer RSPs whether they presently own the target user and if they know the target user's last known location. Once a target LSO corresponding to the location last known and stored in the target's message box is determined, the peer (or controlling) RSP notifies the originating RSP which then requests the last known controlling RSP for the last known controlling LSO.

After the originating RSP notifies the target RSP that it is searching for the target user and user device the target RSP searches its database for the controlling LSO or searches its LSO's for the one in control. In this scenario the target is not found, therefore, the target LSO as determined by the target RSP responds that the target user ID cannot be located (the modem may be off) and also provides the last time stamp of when the target user device or SU modem was enabled. This time stamp is sent to the target RSP which then broadcasts a local search request to the peer LSO's to determine if any of the peer LSO's within the RSP's network are presently in control of the target user. If an LSO responds in the affirmative then the address of the target user is sent to the originating RSP and to the target user's message box for updating and the message may be simultaneously routed from the originating LSO to the target user. If the LSOs controlled by the target controlling RSP respond in the negative then the target RSP returns a "not found" response, the last known LSO location and a time stamp of when the target user was last in communication to the originating RSP.

Since the LSO's and RSP's for each WAN network are constantly being updated with the last known locations and time stamps there is a built in purging mechanism which is invoked after a predetermined amount of time so that the LSO's and RSP's are not overloaded with endless strings of "not found IDs". However, the LSO's and RSP's will continue to maintain the last known location and time stamp for the predetermined amount of time so that messages may be efficiently transmitted to either the message box or to the target user the next time they are enabled. The target RSP therefore sorts the "not found" messages, forwards the most recent known location to the originating RSP and broadcasts the same message back to its own LSO. This is again, a "not found" time update to all LSO's and RSP's except the one that has already reported a not found. The originating RSP then broadcasts a message to all its peer RSP's that the target user has been searched for and not found thereby ending the search. The originating RSP collects all the responses, looks for an active answer, and if a last address is found it is sent with the time-stamp to the user's message box in its home RSP network. If there are no active responses identifying the last known location and time stamp of the target user, then the originating RSP informs the originating LSO and the target user's message box with a time stamp of the search.

The next sequence of events constitutes a normal flow where there are multiple found active locations. This, however, can not happen since it is not possible to have multiple active locations since an SU's modem can only be in session with one LSO at a time. In a last sequence of normal flow events, there is a situation where multiple responses may be made identifying locations and time stamps of when a target user was last known to be situated. In this sequence of events the initial steps as noted above are again followed. That is, the target user registers with the closest LSO and RSP (i.e. controlling LSO and RSP) if the target is logged on. Again, at the same time, the target RSU message box is updated with the location and a time stamp identifying the time at the noted location. Again, an originator will be desirous of transmitting a message to a target user. Therefore, the originator sends a message to its home LSO which searches its local database to determine whether the target user is within its exchange. If so, the message is routed to the target user. However, if not, and the current route is unknown, then the originating LSO asks the originating RSP whether the target user is presently owned by another LSO within the network. If the RSP has the address location of the target user, then it responds to the LSO which is then able to transmit the message to the target user. If not, the originating RSP asks the home RSP that owns the target user's home LSO and message box for the current target user location. This is possible because the target SU transmits or sends ID codes to its controlling RSP identifying its home location and the controlling RSP makes this information available. If this fails, the originating RSP will then ask the other peer RSPs whether they presently own the target user and/or whether they have a last known location and time stamp for the target user. The originating RSP then establishes a communication link with the RSP last known to have contact with the target user which in turn asks their corresponding LSO's whether they presently have contact with the target user. If a target LSO responds back to the RSP in the affirmative then the RSP returns the location of the target user to the originating RSP. Otherwise, the target RSP responds that the target user is not currently active within the network or has not been found which causes the message to be transmitted and stored in the target user's message box.

Since it is possible that multiple locations may be reported to the originating RSP, the originating RSP sorts through the responses received by the peer RSP's by time stamp and reports "not found," last known location and latest time stamp to the originating LSO and the target user's home RSP. This updates the target user's message box with a "not found," a "last known" location, and a time stamp. Thus, the originating RSP merely finds the most recent time stamp and location and refers to that when multiple locations and time stamps are received by the peer RSP's. In this way, the most recent location and time stamp are stored in the message box and the rest are discarded for waste management and storage maintenance.

In short, it should be noted that the originating RSP in control of the originating LSO refers directly to the message box of the target user for the last known location and time stamp of the target user before asking the peer RSP's. In this way, the originating RSP may go to the last known network of the target user and request the required information from that RSP. If the RSP responds in the negative then the originating RSP may then seek the location and time stamp information for the target user from other peer networks.

The present logical network may have an auditing circuit and controlling software which identifies whether the end user RSU is merely a phone for communicating in voice, or a message receiving device such as a facsimile machine, computer or pager. The network merely addresses the target device once the user is determined and found, so ultimately it doesn't matter who the actual end user is once found as it merely addresses the instrument. However, the type of device must be identified to determine what type of message, whether it be voice or data, can be received. Thus, when the LSO ultimately addresses the SU it determines if the end user SU is a cellular phone, desk phone, lap top computer with a modem, or other type of device. So, if the SU end user device is a computer with communication and video capabilities, the LSO's could identify this and transmit videos, E-mails or phone messages to the SU. On the other hand, the LSO could identify the RSU as a pager, and transmit an E-mail message one line at a time to the end user if the end user was going to wait for the complete message. Consequently, messages can be sent in accordance with the end user device. The codes and addresses used for identifying RSUs should be universally designed or adapted for overall network compatibility.

In accordance with these and other objects which will become apparent hereinafter, the instant invention will now be described with particular reference to the accompanying drawings.

DESCRIPTION OF THE PREFERRED EMBODIMENTS

With reference to the drawings, FIGS. 5-11 illustrate a representative portion of the cellular user location system 10 comprising a plurality of peer wide area networks (WANs) 20, 30 and 40. Note that the cellular network is used for example only. The invention is applicable to any telecommunication radio network that allows mobile (wireless or fixed) subscribers to communicate. FIGS. 1-4 illustrate background cellular telecommunication physical network systems which typically comprise MTSOs which identify the location of cellular devices within their area of coverage based on the control channel, the MIN number, the ESN number and the cell within which they are communicating from. The physical and logical cellular networks comprise existing cellular telecommunication systems which establish the actual physical airlinks, as well as the wireline communication links, between a remote cellular device and either another remote device or fixed wireline communication device via transceivers in individual cells and wireline subscriber units (WSUs).

The instant invention 10 utilizes the physical cellular, radio or public switch network (PTSN) 70 to locate and track the location of subscriber units (SUs), such as remote subscriber units (RSU's) 50-62 and wireline subscriber units (WSUs), and their users. The system 10 preferably provides a novel, logical network comprising a plurality of WANs 20, 30, and to work in conjunction with the existing physical radio and cellular networks for determining the SU device identification and specifications, the actual user identification, and the location of the user for routing messages to the user regardless of the device being employed without the target user having to actually retrieve the message from a home location or the originator having to know the target user's device, identifications, or location. That is, the originator only has to know the associated phone number of the target. Thus, the instant invention employs a novel logical network 10 that performs the legwork in establishing communication links, correlating target phone numbers with the actual target device and target user, and routing messages thereto. In accordance therewith, the instant system 10 accomplishes these goals by providing a plurality of interactive local service offices (LSOs) 21-24, 31-33, and 41-46, and a regional service point (RSP) 25, 34, and 47 in each WAN network cloud 20, 30, and 40 for communicating with physical networks, such as MTSOs and transceivers, collectively referenced by 70, in their network and with RSPs in other WAN networks.

Figure 1:
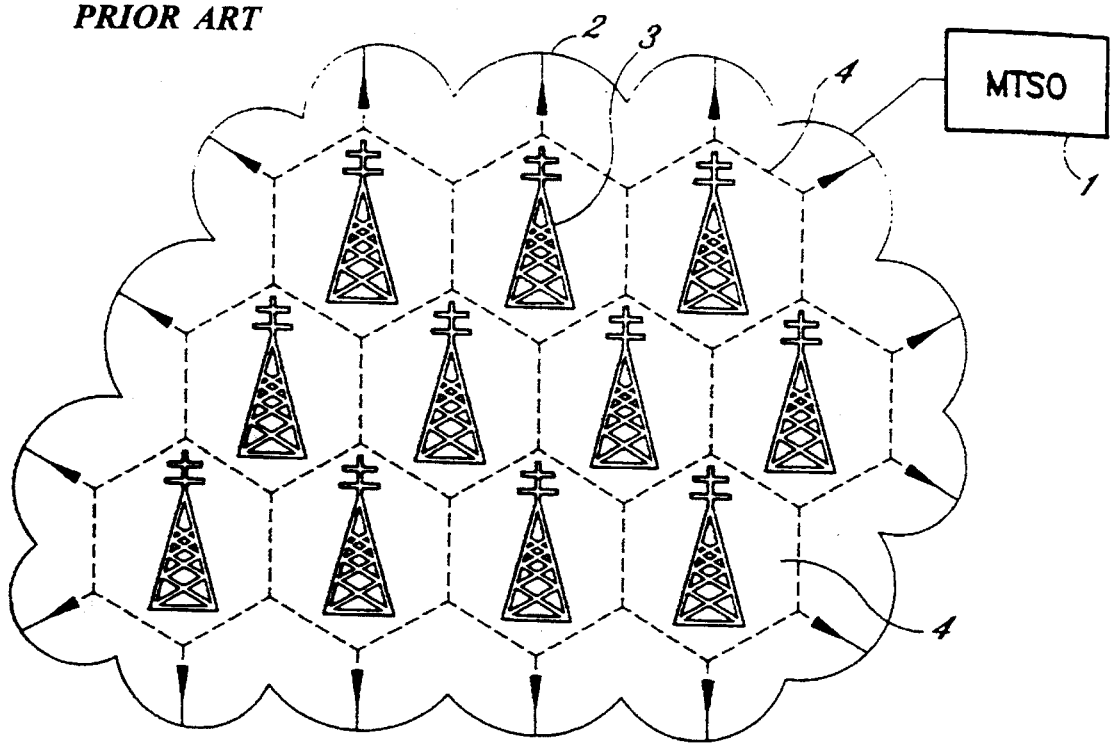
FIG. 1 is a system drawing of background cellular networks illustrating the division of communication cells and the controlling station.
Figure 2:
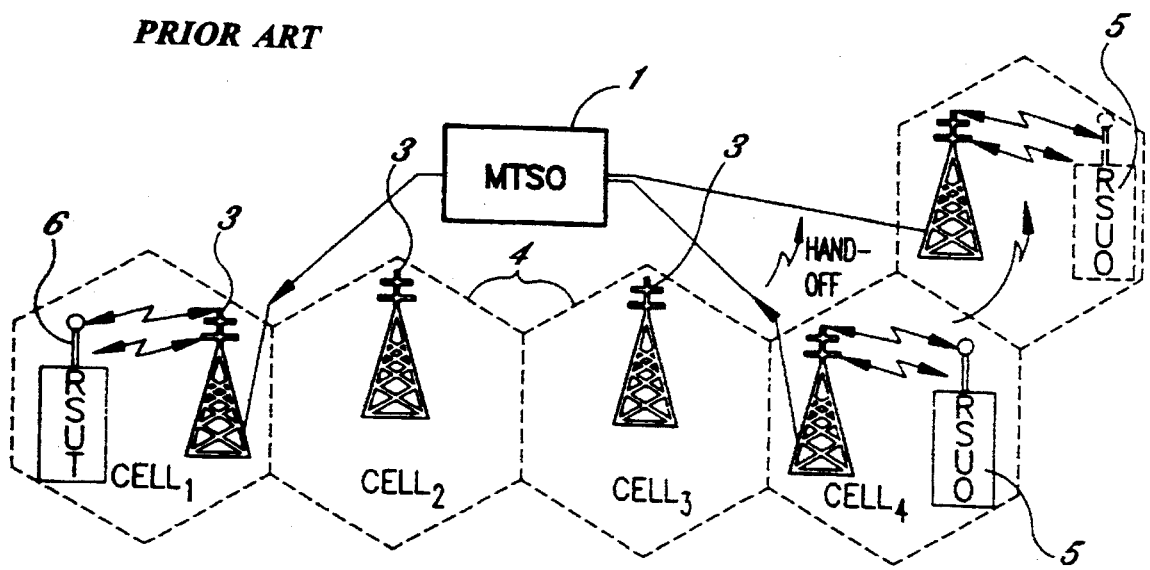
FIG. 2 is a system drawing of background cellular networks illustrating two devices communicating and a hand-off between cell transceivers.
Figure 3:
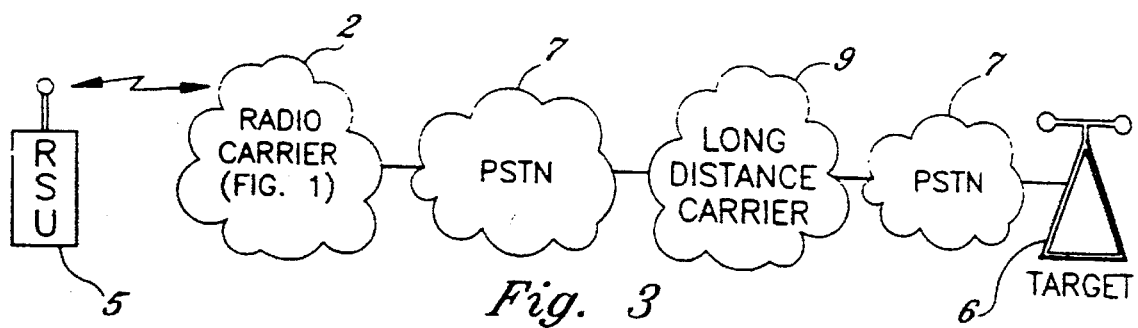
FIG. 3 is a system view of a remote telecommunication device communicating with a fixed target device in background systems.
Figure 4:
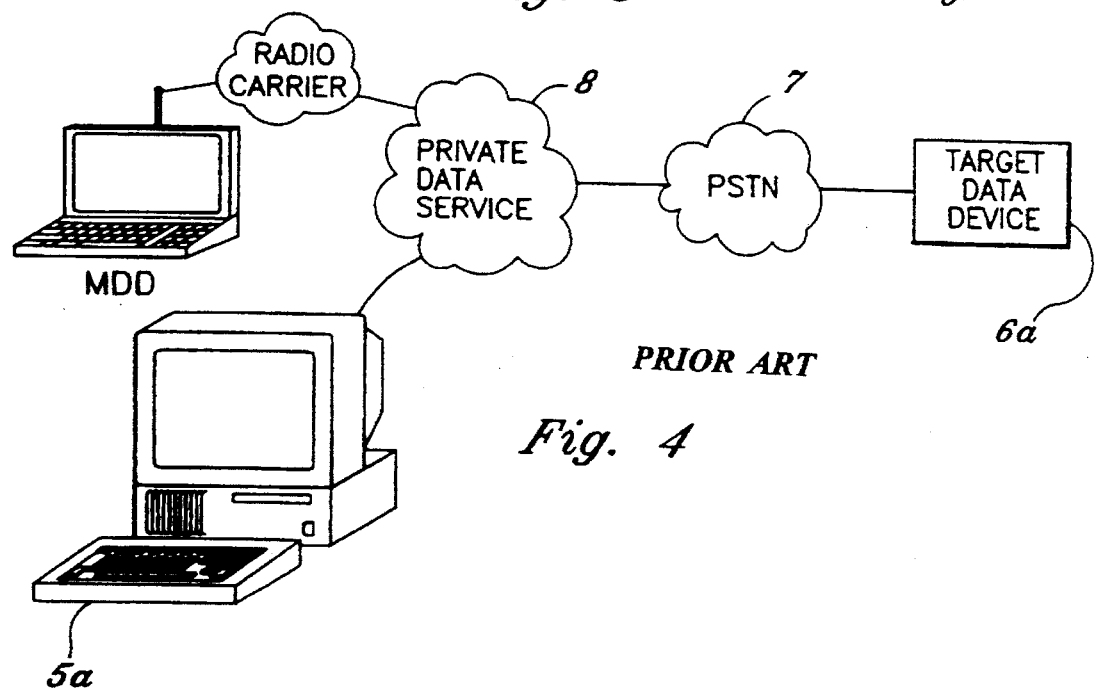
FIG. 4 is a system view of a fixed computer and a mobile data device communicating with a fixed device in background systems.
Figure 5:
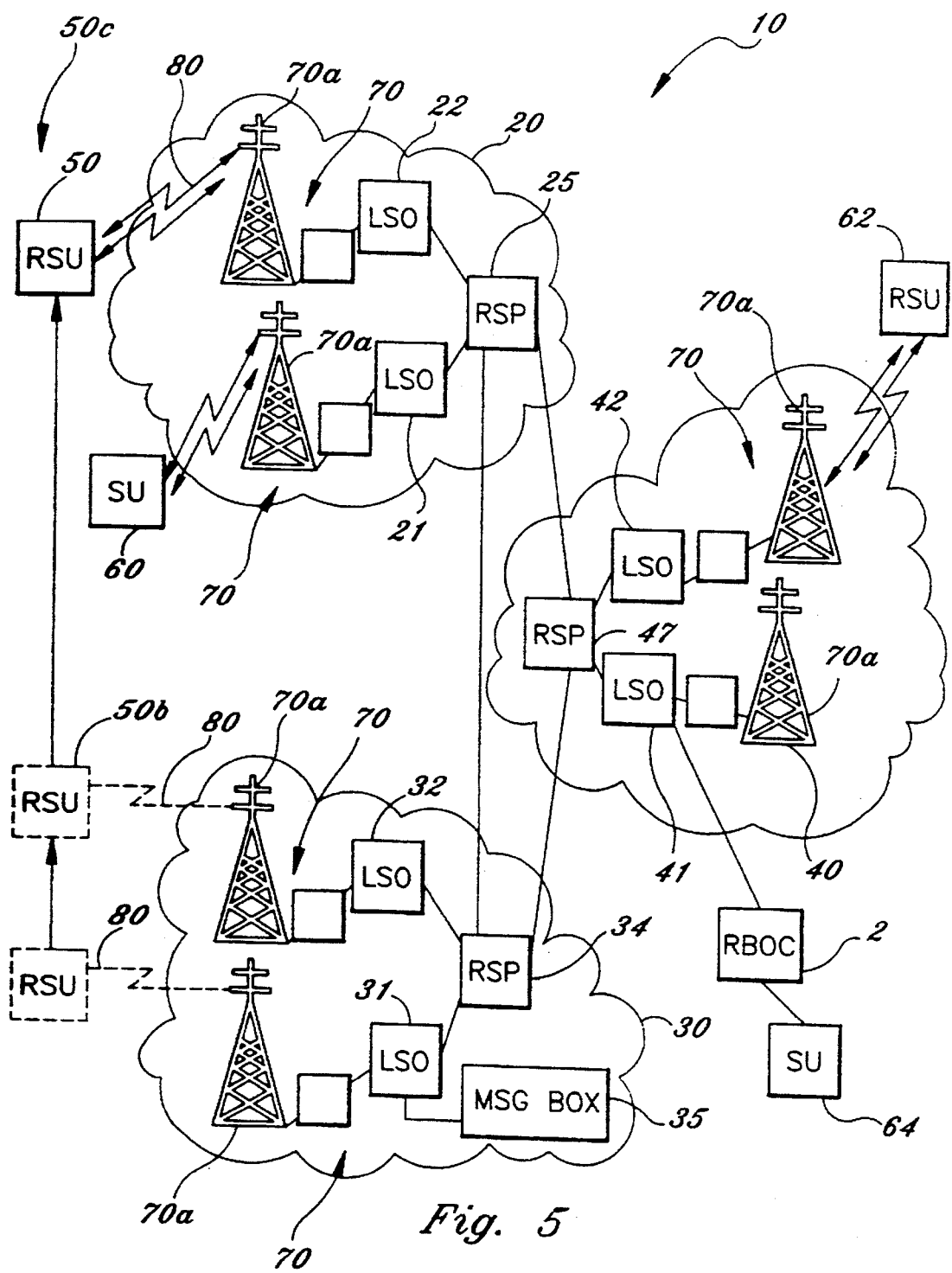
FIG. 5 is a system diagram of the preferred embodiment of the instant invention illustrating a portion of the overall system with three wide area networks.
Figure 5A:
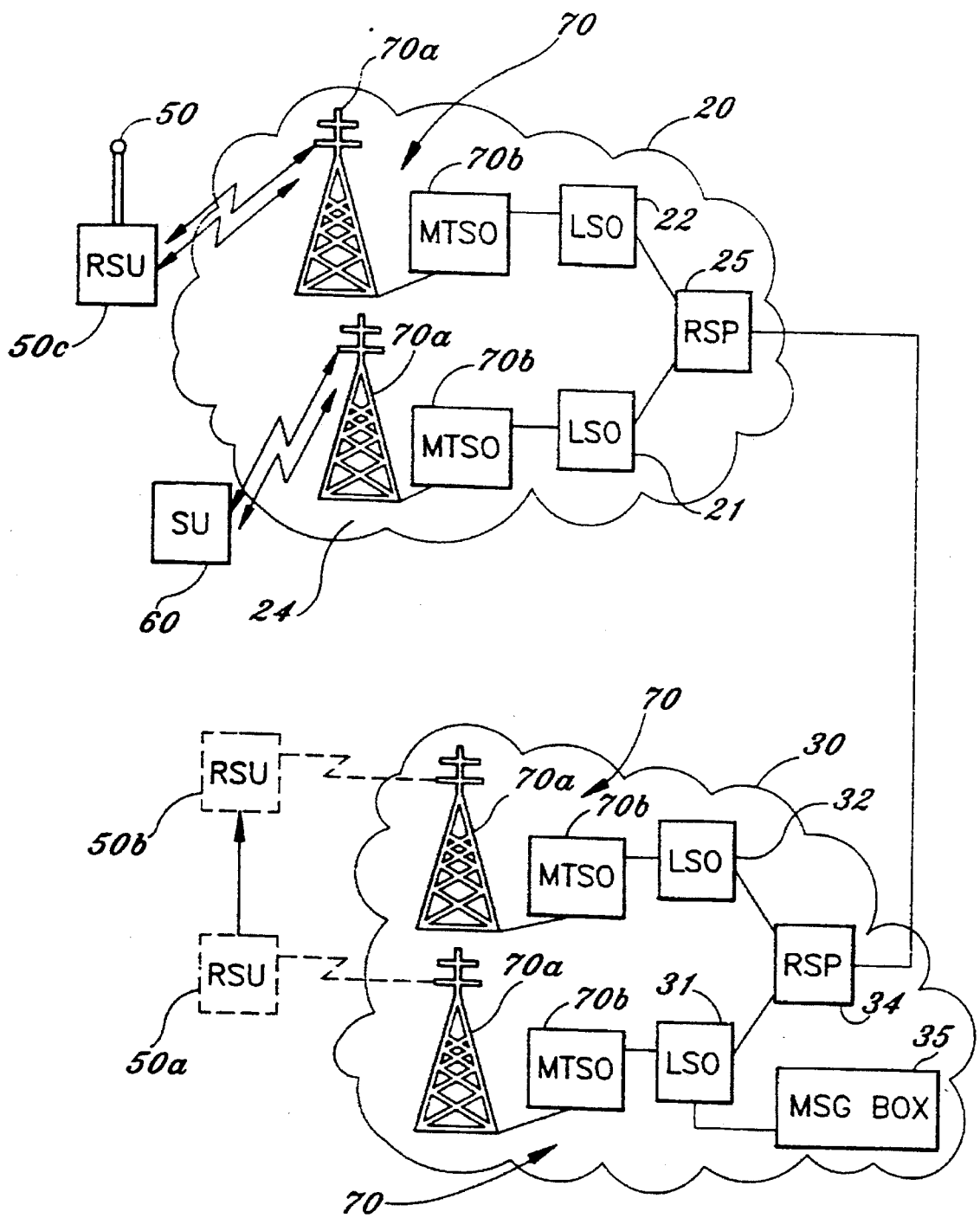
FIG. 5A is a system diagram of the preferred embodiment of the instant invention illustrating a portion of the overall system with two wide area networks each using an MTSO in the physical network.
Figure 6:
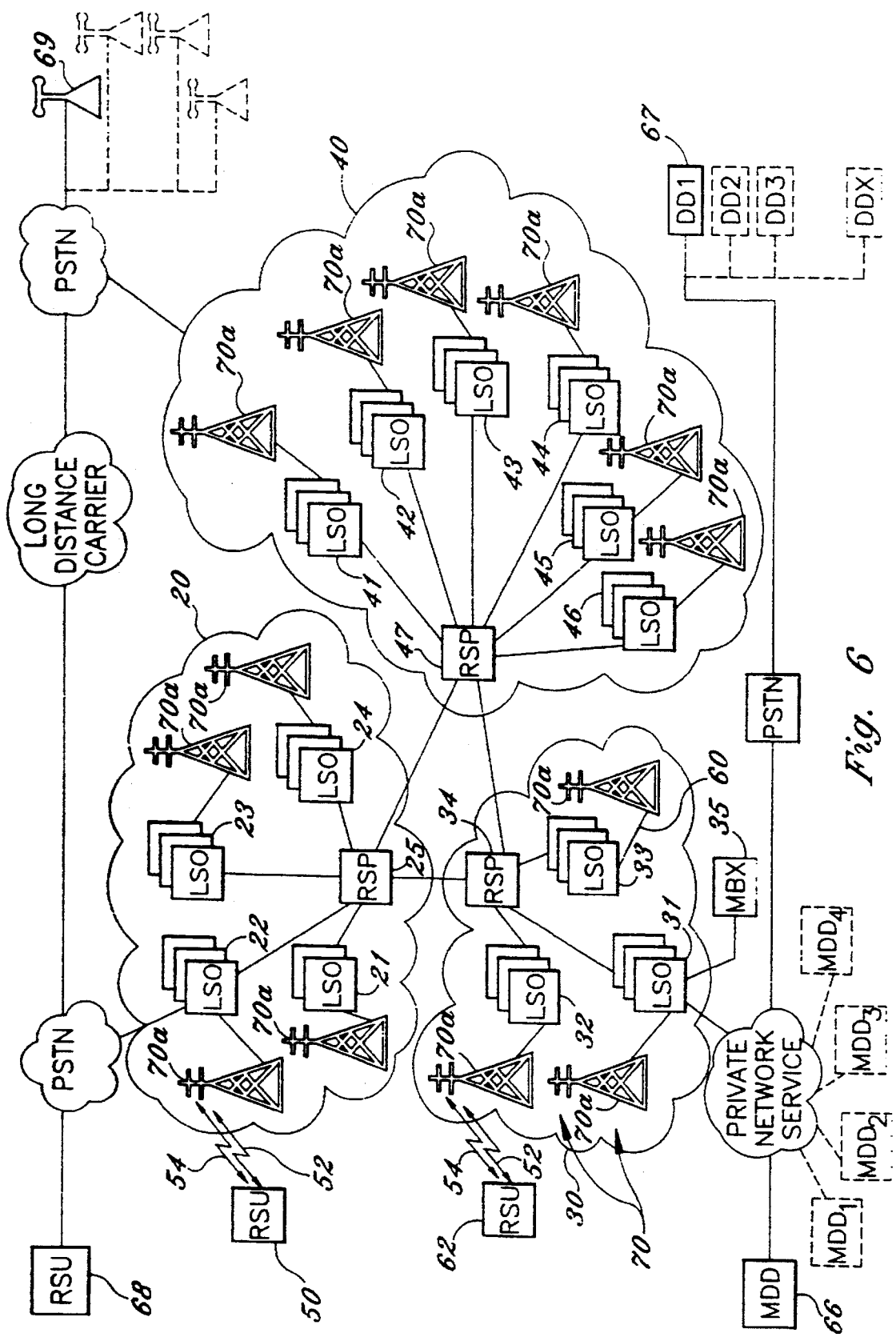
FIG. 6 is an integrated system diagram of the preferred embodiment of the instant invention in communication with typical background systems which are two directly incompatible networks, one being a remote telecommunication network and the other being a mobile data device in a private network, wherein the networks are able to communicate through the instant invention as shown.
Figure 7:
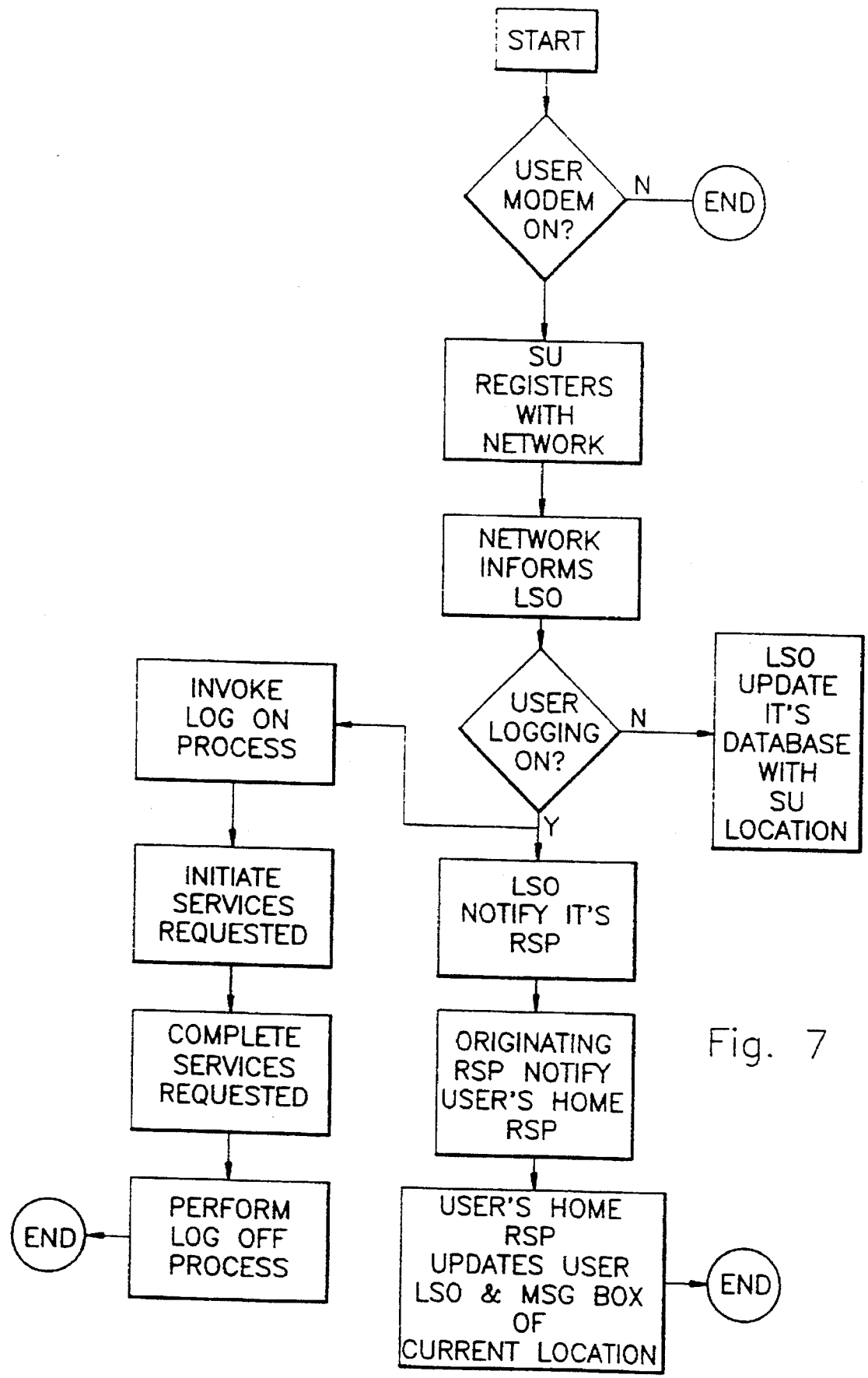
FIG. 7 is a flow diagram of the first or initial step of the preferred method of operation of the instant invention, illustrating the preferred method by which a subscriber unit registers with a network.
Figure 8:
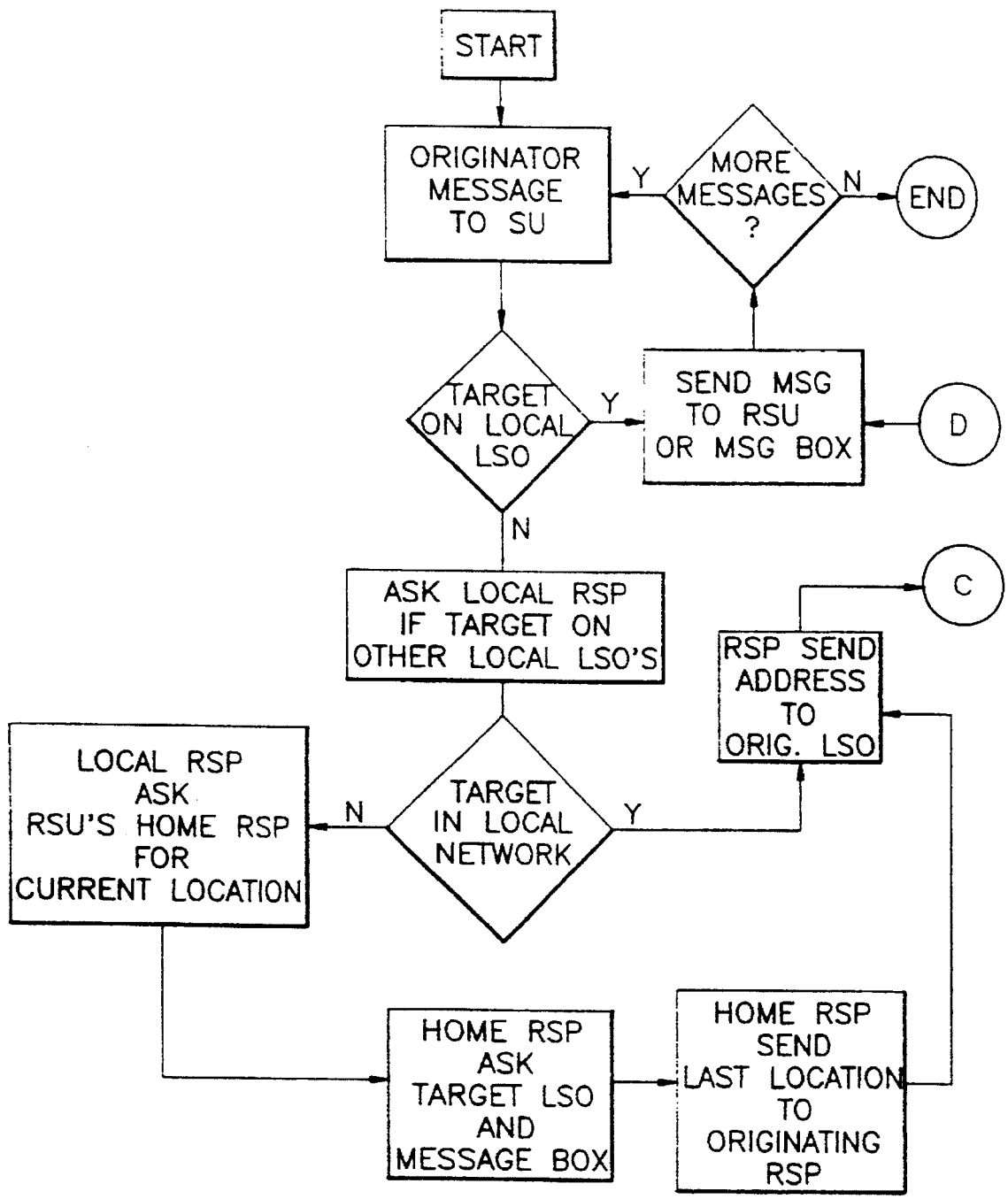
FIGS. 8-8B is a flow diagram of the preferred method of operation of the instant invention in a normal flow sequence, illustrating the instant invention system response to a subscriber unit determination that user is not found.
Figure 8A:
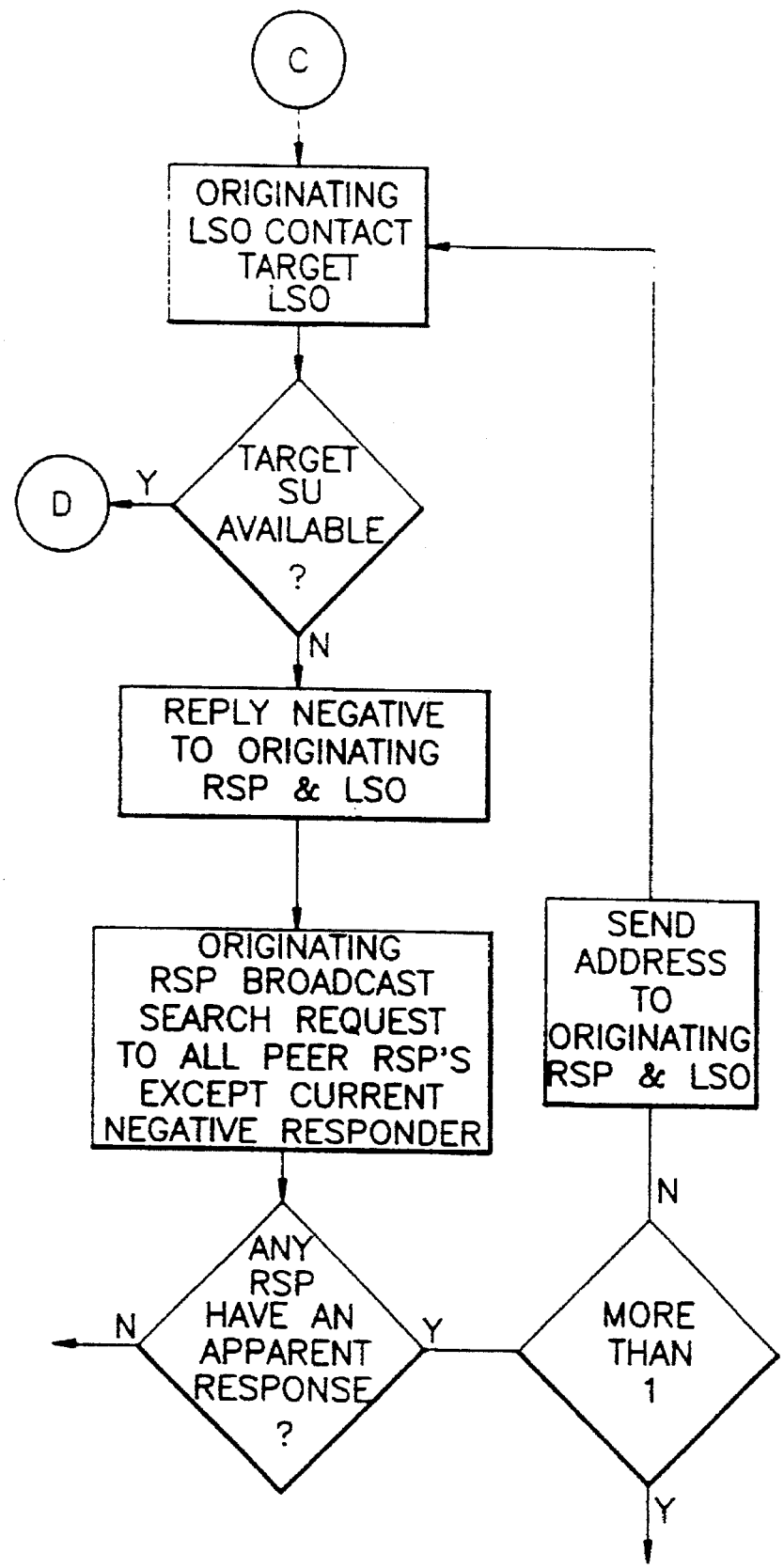
Figure 8B:
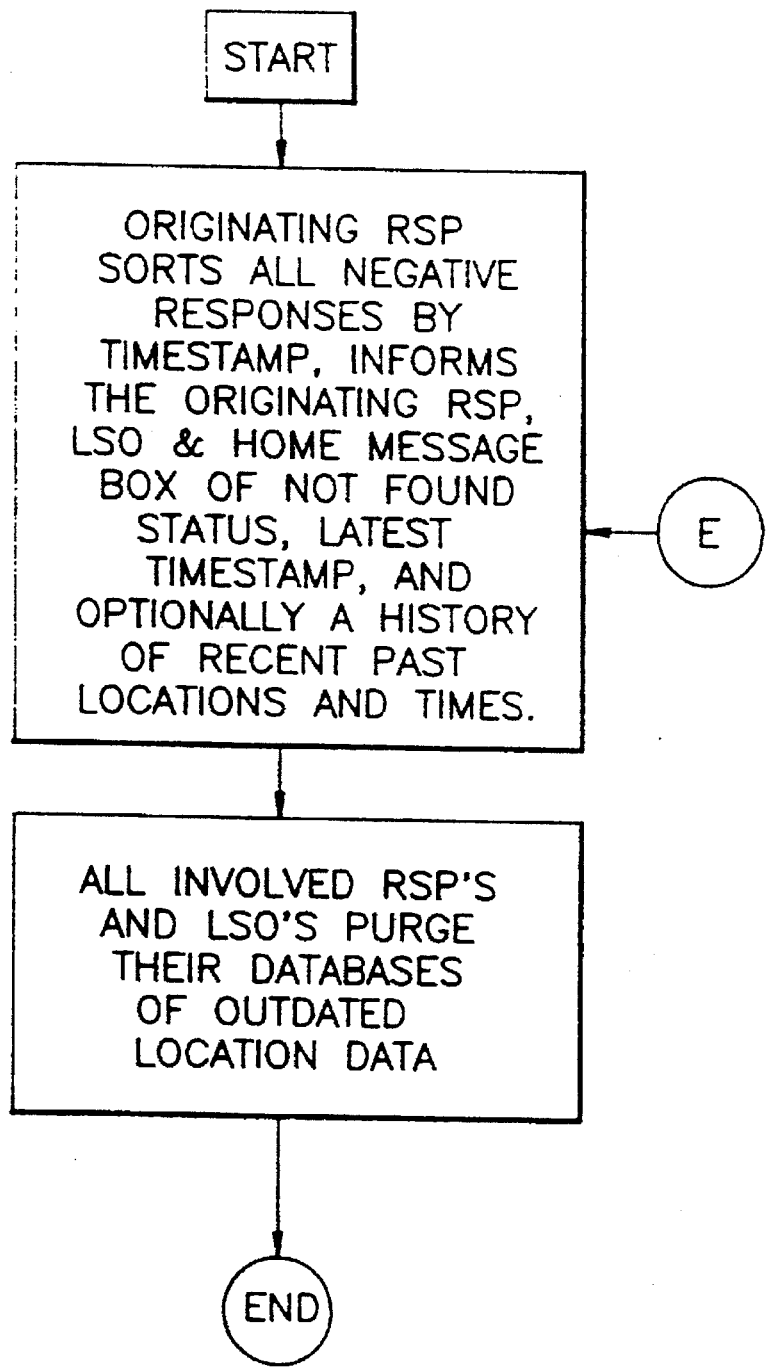
Figure 9:
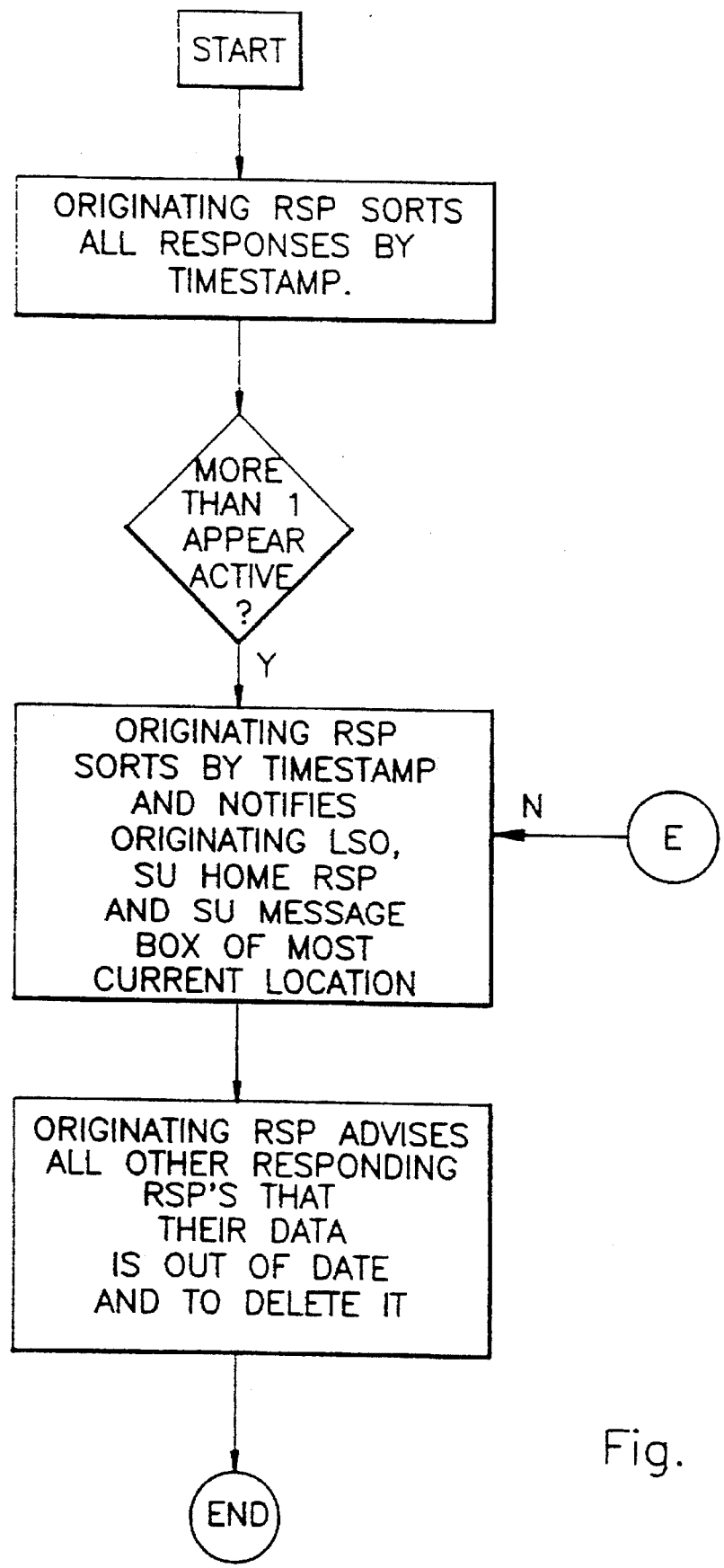
FIG. 9 is a flow diagram of the preferred embodiment of the instant invention, illustrating a normal flow sequence of steps, illustrating the system's response to a subscriber unit determination and multiple reported locations for the subscriber unit.

Each WAN 20, 30, and 40 comprises at least one regional service point (RSP), 25, 34, and 47, a plurality of associated local service offices (LSOs) 21-24, 31-33, and 41-46, respectively controlled by the RSPs 25, 34, and 47 and an MTSO/transceiver physical network system 70, electrically associated with each LSO. FIGS. 5, 5A, and 6 illustrate the WAN networks, showing the flexibility available with the preferred embodiment of the instant invention, wherein any number of LSO stations may be employed to cover a geographical exchange area. The instant invention establishes telecommunication airlinks or direct links with individual remote subscriber units (RSUs) 50, 60, or 62, or wireline subscriber units (WSUs), e.g. 64, 66, or 68, respectively, to determine the location of the SUs, providing messages or confirmations that messages exist at the SU's home location. Referring to FIG. 5, an RSU 50, in position 50c, is able to communicate with a home location by establishing a communication with the closest or controlling LSO 22 (for the scenario depicted in FIG. 5) via the physical network 70 (comprising an MTSO 70b and transceiver 70a). LSO 22 communicates with its controlling RSP 25 in the corresponding WAN 20. If the RSU 50 is enabled, such as by its modem or server, then the controlling LSO 22 receives and stores the RSU 50, the user identification and location data in its register. If the RSU 50 is also logged on, logging on, or preparing for activity, then the controlling LSO 22 updates its controlling RSP 25 with the device and user data and the controlling RSP 25 updates the user's message box 35 via the user's home RSP 34. That is, the controlling RSP 25 sends the RSU 50 device, user, and location information to the home RSP 34 over the physical network. The home RSP 34 registers and stores this information with a time stamp and simultaneously updates the user's home LSO 31, both of which are located in the user's home WAN 30. The LSO 31 also stores the device and user data in its register with a time stamp and simultaneously updates the user's home message box 35. The message box 35 stores the user's device and location information, along with corresponding time stamp, thereby making the most recent device and location information available for retrieval by peer networks in future events. The RSU 50, as in FIG. 5, 5A, and 6 may be any mobile communication device which roams between its normal home location 50a and other locations 50b and 50c. The device may also be any portable subscriber unit (SU) which may be transported and plugged into other networks. Within any wide area network 20, 30, or 40, the RSU 50, if cellular, communicates with transceivers and LSOs in cells defined by the physical network. These LSOs may serve entire regions or states. When traveling outside the nominal or home WAN, such as WAN 30 in FIG. 5, and 5A, the RSU 50, or SU, enters new WAN networks and temporarily registers with the corresponding or controlling LSOs defined by the new WAN, such as WAN 20 in FIG. 5.

The RSU 50 can store and retrieve messages at some location from its message box 35. Typically, however, in the preferred embodiment, when the user is not located and a message is stored in the message box 35, the next time the user logs on, the message box 35 will inform the RSU 50 user that messages are stored in the message box by a known broadcast signal individual to the user. The user may then have the messages transmitted to its device. This confirmation of message updates is broadcast to the RSU 50 user, or is sent to the WSU user, once the location of the user is determined. The location of the user is determined by enabling the RSU 50 device, or WSU device, and automatically registering with the controlling LSO in the WAN area. The user does not have to check in once enabling the SU device to see if messages were left while the device was disabled. Rather this is done automatically. If desirous, the user can have the messages transmitted to its present device without having to ascertain and reveal the type of device being used since the home location register or message box 35 is able to ascertain this information by the identification codes broadcasted from the RSU 50 and/or sent over the physical network 70.

For the sake of example, the RSUs 50 are shown as wireless communication airlink cellular devices making airlink connections across the physical network 70 to the LSOs. The instant invention provides a novel logical network that may communicate with wireline and wireless physical networks including cellular digital packet data (CDPD) networks as used by IBM® in their ICS ™ network (trademark of IBM®), AMPS™, analog systems or other wireless communicating means. The system is also compatible for wireline networks as shown in FIG. 6 while the target end user device 66–69 is connected to the network. That is, the essence of the instant invention is to automatically route messages from an originating device to a target device with the originator only knowing the phone number of its intended target user and not the MIN, ESN and control channel numbers, and without the target user having to perform a procedure to retrieve messages from some home location left by the originator. In addition, the instant invention is described with originators and targets, but this is communication specific where the roles of target and originator device change.

For wireless networks or RSUs 50, the underlying requirement is that in any area of coverage the local service offices 21–24, 31–33, and 41–46 are to be updated with the RSU 50, 60, and 62 identification codes and their location when a roaming SU is within the LSO's control area and that the LSO be able to route and transmit messages to the RSU 50. Thus, the LSO must be able to establish a link with the physical network for communicating with the RSU. The LSO's 21–24, 31–33, and 41–46 are able to perform these functions because they are computer based systems having microprocessing, storage and logical control algorithms for storing, retrieving, updating, and sending device and user data along with time stamps, and having communication devices, such as modems or serves that allow them to tap into the physical network 70. Therefore, the LSOs 21–24, 31–33, and 41–46 comprise logical network intelligent components with ROM and RAM which stores user RSU identification and location information temporarily so that messages are able to find the RSU user. However, other storage mediums may be used, like CD-ROM. The instant invention utilizes the physical network, including radio, cellular, wireline, and public switch telephone (PTSN), to establish communication links and to detect a roaming RSU user or portable SU as it passes through or hooks up to the different exchanges. The MTSO 70b of the physical network 70 broadcasts or transmits the cellular, radio, wireline, or PTSN (e.g. regional bell operating carrier) network system's identification number (SID), while the RSU responds with a broadcast of its MIN and ESN numbers as discussed above in the background discussion.

The second requirement is that the receiving, controlling or local LSO 25 of the WAN network being occupied by the RSU, report the RSU's 50 ESN or MIN, device type identification code and a user ID to the controlling RSP 23 (see WAN 20), to the nominal home LSO 31 and to the message box 35 when the user actually initiates a network service request. Wireline SU (WSU) devices need to identify themselves as well. Another primary requirement achieved by the instant invention is that it provides a logical network system that "Reaches Out" to an SU 50, 60, 62, and 64–69 user, usually a mobile user, but also to a wireline user while connected to the physical network, and deliver messages to the user. Messages may be either voice data, data, files, etc. The messages may be delivered in real time or stored in the message box 35 from an earlier period when the originating device was seeking to route a message to a target user or device which was not activated. Another requirement is that the RSU user be able to authorize, or filter, the messages that find him. Finally, these functions and the routing of messages to an RSU 50 or SU 60, 64 user may be accomplished without the involvement of either the originator or target users.

While current and present radio and cellular systems are able to locate an RSU 50, 62 device by broadcasting a SID identification code and receiving an ESN or MIN identification code from the RSU device, in the current radio and cellular environment, users' locations are not sent to the HLR as they pass through regions unless the user places an outbound call. Hence, the user cannot necessarily be located for inbound calls. The instant invention, however, allows remote WAN networks 20, 40 to track, report and store a user's and RSU's location to and in the user's home location and in the regional service points (RSP's) so that voice, data or file messages may be subsequently transmitted to the user automatically. The instant invention therefore provides a home registry or message center 35, LSO's 21–24, 31–33, 41–46; regional service points (RSP's) 25, 34, 47 for temporarily storing a user's location and identification codes; and physical network 70 communication links between peer RSPs 25, 34, and 47 and their corresponding LSO's 21–46, each of which are directly linked in the physical network for communication with at least one corresponding controlling RSP. At the same time, the RSPs 25–47 in peer WANs 20, 30, and 40 are directly linked in the physical network for communicating so as to update each other and to temporarily store users' identification, location, and device data description codes so that the messages may be translated and converted for transmission to the actual user and device.

With reference to FIG. 5, if an originating device, such as SU 60, is desirous of transmitting a voice or data message to an RSU 50, it establishes a link, either direct or airlink, through the physical network 70 with its home LSO 21. Subsequently, the originator LSO 21 searches its database for the target user identification information to see if the user is presently within its exchange. If the originating LSO 21 does not have the target user RSU 50, then it asks its controlling RSP 25 for this information. The controlling RSP 25 checks its database, or memory registers for the required information. This is possible because the RSPs, like the LSOs, are computer based systems with memory banks (e.g. RAM, ROM, CD-ROM, CD-RAM, or similar memory), controlling software, microprocessors and communication peripheries, such as modems or servers. If the RSP 25 does not have the target RSU 50 user ID stamp representing current control of the device, it will first conduct a search request with the other LSOs in its WAN 20, and then with the peer RSPs 34 and 47 in other WANs. Thus, the LSOs 21–46 and RSPs 25–47 comprise computerized base systems with read and write type of memory databases for temporarily storing RSU 50 and 62, and SU 64–69 device and user specific information when SUs 50–69 enter the WAN field. The LSOs and RSPs have communication links with each other through peripherals such as modems or servers, and the physical network 70 for directly communicating and providing user and device data upon request. This allows the LSOs, RSPs, and WANs to search, request and locate target users.

The LSOs 21–46 provide means for monitoring physical network, logical network, and airlink traffic produced by wireless and wireline communication devices (SUs), and means for tracking and temporarily storing communication device and user related information along with time stamps so as to track and route messages to the devices. The RSPs 25–47 perform the same functions as the LSOs, however, they also perform a managing functions of the LSOs within the network they control wherein they are essentially a liaison between the LSOs and their network and the RSPs of other networks. In other words, the RSPs are directly linked to each of their LSOs and other RSPs so that they may efficiently determine whether any of the service offices (LSOs) under their control are in current contact with a specific device and user. Thus, the RSPs are in direct communication with their LSOs and in addition with the RSPs of other networks or WANs to allow global searching of users in communication with users' home location.

The communication and location network 10 of the instant invention, therefore, generally comprises a plurality of peer wide area networks (WAN's) 20, 30 and 40, wherein each network includes a regional service point 25, 33, or 47, and a plurality of local service offices (LSO's) 21–24, 31–33, or 41–46, each with a corresponding MTSO/transceiver device 70. The instant invention may also include an actual remote subscriber unit (RSU) 50 and/or a wireline subscriber unit (WSU) (interchangeably referred to as subscriber units'(SUs)), which typically includes a cellular telephone, radio communication device, or other communication device such as a portable computer or facsimile having a modem or server with cellular or radio capabilities. In a typical communication locating network system 10 setup each WAN 20, 30, 40 may be sequentially identified in software by an address, device specific identification, or a subscript with an incrementing numeral, that is, WAN subscript N, WAN subscript N+1 . . . and WAN N+X or other identifier series. Likewise, each LSO 21–46 and RSP 25–47 may be identified by a sequential subscript, serial identifier, or address corresponding to select controlling RSPs or by any other conventional identification code means. Each WAN is controlled and managed by a regional service point (RSP) 25, 34, and 47, which controls a corresponding plurality of LSOs in the network. The controlling RSPs 25–47 of each WAN are linked by a physical network 70 so that the RSP's of peer WANs communicate directly. Each RSP is linked to its corresponding LSOs for communicating with the LSOs, responding to data requests from the LSOs, storing data provided by the LSOs, and managing the LSOs. The links between peer network RSPs and RSPs and LSOs are preferably computer communication links over multiple bit buses, cables, phone lines, such as regional bell carriers, PSTN, or other carrier links which may be made between modems, servers, or similar peripherals in a national network. Thus, three WANs 20, 30, and 40 and their RSPs 25, 34, and 47 may cover three different regions of the United States but be in direct and substantially real time communication, as seen if FIGS. 5, 5A, and 6. In each communication sequence, whether between RSP's or RSP's and their corresponding LSO's, the communication is confirmed by acknowledgments (ACK) commands which confirm communication links and the receipt of commands or requests. The instant invention logic discussed herein may be used in any mobile or fixed network system where the RSUs can respond to a network poll through its own modem or server.

A WAN 20, 30 and 40 may be described as a communication cloud, such as those shown in FIGS. 5, 5A, and 6, which hosts a number of transceiving user and communicating devices, tracking and monitoring systems, i.e. LSOs, so that messages find a user independent of location and the device being used and to allow SUs to establish communication links. The WAN 20, 30 and 40 may help connect originating SUs 60, such as cellular radio or wireline phones, portable computers or facsimiles with a target RSU 50, such as a mobile or portable cellular phone or computer by locating the user of the target device and thus providing this location address to the originating device without end user interaction (i.e. except for an initial dialing of a number). The RSPs 23, 33 and 43 provide a central communicating control point, including a computer which directly communicates with the LSO computers and with other RSP computers in peer WAN's, for transferring new and SU device user specific information. Each LSO in a WAN is directly linked to a physical network 70 and a controlling RSP so that both may have access to a user's home message box 35 to retrieve identification and location data. For example, referring to FIG. 5, an RSU 50 can communicate over the physical network 70 with the transceiving tower 70a corresponding to the local LSO 22 in current contact with the device for receiving messages. Each RSU 50 typically has a modem or cellular or radio transceiver so if it is active or enabled the LSO 22 can transmit the message received from the originating SU 60 or message box 35 via its corresponding transmission device 70a as defined by the physical network 70.

It should be noted that the specific reference numerals identifying certain LSOs and RSPs are merely specific to the figures provided for the given situations shown and may be described with respect to other LSOs and RSPs depending on the location of the RSU. Thus, it may be said that the RSU 50 establishing a communication link across the physical network 70 may be the originating device. The RSU represents a mobile communicating device which roams between its nominal home location 50a and other auxiliary locations 50b and 50c. Messages intended for an RSU user can be stored in the user's home message storage device 35 at its nominal home location 50a if the RSU is not enabled at that particular time the message is originated. Messages are also temporarily stored in the originating LSO before transmitted to the users box 35 or device 50. The message box 35 is also updated periodically by the RSU 50 with its current location. This is possible because the WANs, or RSPs, are substantially meshed such that a controlling RSP can receive user and device data from the controlling LSO (the LSO in communication contact with the device) and send this data to the home RSP which routes it to the home LSO and message box 35. When updated the message box 35 stores the location address and gives it a time stamp. Accordingly, peer LSOs 32 in the same WAN, or remote LSOs 31, 32, 21–24, and 41–46 can request the last know location and time stamp via the RSPs 25, 34, and 47 to help locate a user via the location reported by their RSU 50 device before transmitting a message. The message box 35 may also store the message of the RSU 50 if the RSU 50 is not enabled or located and subsequently transmit the message once the RSU 50 reports again.

For the sake of example, the RSUs may be shown as wireless communication cellular devices which are linked to the LSOs via corresponding transmission or transceiving towers 70a, the physical network 70, and the physical airlink network 80. The physical network 80 is that network and frequency band used in conventional communication for transmitting airlink, and, CDPD or PSTN routed communications or other radio communications. The physical network 70 and 80 typically includes the airway transmission medium 70b MTSO and MSC's discussed in the background art and shown in FIGS. 1 and 2, for establishing airlink communications with the mobile RSUs 50 in their respective area of coverage. Any type of physical network for establishing wireless network communication between the RSUs 50 and transceiving towers 70a shown are possible for use with the logic networks described herein. Each of the communicating devices, that is, the RSUs 50, LSO's and RSP's, typically contain a modem, server or other communication transmitting and receiving peripheral that can communicate with any physical communication network. The instant invention also communicates and routes messages to and from fixed wireline devices as seen in FIG. 6.

For wireless networks, the underlying requirement and goal achieved is that an area of coverage for a mobile telephone servicing office (MTSO) in the physical network as discussed in the background art, detects a roaming user (RSU 62) at various locations, such as 50a–c, as the RSU 50 (or 62) user passes through peer WAN networks 20, 30 and 40. This is true of any mobile communications system. However, unlike the background art, the instant invention provides a universal system 10 by continually monitoring, tracking, and recording the location of the RSU user and updating the user's home message box 35. The system 10 makes this data efficiently accessible through the physical and logical network over existing phone or communication lines so that messages may be routed to the user when the RSU communication peripheral (modem or server) is enabled with main or auxiliary power without requiring the user to make a special call or connection to a home office base station or VLR to check and receive messages. That is, the messages find the RSU 50–62 user because the RSU 50 user's location and device information is continually updated and monitored by the controlling LSO's, RSP's and message box. The RSUs 50–62 respond to the physical network broadcast by identifying themselves with a user ID, device type ID, and the conventional MIN, ESN and control channel and location ID's. The control channel may comprise one channel 54 for transmitting device control data, while an information channel 52 may be used for transmitting the identification data. Meanwhile, the instant invention 10 responds to RSU 50 identification beacons by identifying the wide area network and local office addresses controlling communications to the RSU. The RSU 50 beacon ID is picked up by the physical airlink network 80, transceiver and transmitted by the physical network 70 to a corresponding LSO 22. The user and device identification of the RSU 50 is sent over the physical communication link to the controlling RSP 23 for storing the RSU ID, user ID, location and control/information channels being used for communication. Knowing the location of the RSU 50 enables messages to find and reach the user without requiring the RSU 50 to originate the communication transmission from the message box or originating LSO. This is because the RSU 50 identifies its registered features, made of communication and serial ports so that messages may be configured into the proper format for receipt at the location provided by the device. Therefore, while conventional physical cellular communication is known as far as it relates to the switching centers, MTSO's, and regional cell management, the logical network of the instant invention comprising the fully meshed WAN networks 20, 30 and 40 for routing messages instead of the user retrieving them based on tracking users is not known.

Another requirement of the instant invention is that the physical network report the RSU 50 and user identification (ID) and location information to the closest or corresponding LSO. The instant invention establishes links with and takes advantage of the present physical networks available, as discussed above, to link SU device, user and location information to corresponding LSO's 21–46 as location and devices used by the user change. The essence of the instant invention is to know the location of the user and chosen SU 50–69 at all times as well as the particular SU 50–69 device being employed. Therefore, the SU 50–69 cooperates by transmitting its most current location, device and user ID's to its home message box 35 for retrieval by originating communication devices and corresponding LSO's. With reference to FIGS. 5 and 5A, the SU 60 unknowingly gets its information via its controlling originating LSO 21 in the area network, and the corresponding RSP's 23 and 33. That is, the originator only has to send the message via the phone number dialed and receive a confirmation that the message has been transmitted. Once the message is transmitted to the originating LSO 21, the actual originator does not know or need to know the system interaction between the LSOs, RSPs, message box 35 and target RSU 50 in routing the message to the target. Once a target user location is determined, the originating LSO 21 transmits the message to the target user via the physical network 70 and 80.

The RSU 50 identifies its location by transmitting identifying beacons to the closest or corresponding LSO, reference 22 in FIG. 5, which temporarily stores the RSU 50 identification and location information until the RSU 50 is no longer in the LSO's 22 controlling range. Therefore, the instant invention provides a system and network that allows an originator SU 60 to transmit a message from either a mobile cellular device, as seen in FIG. 5 or from a wireline device, as seen in FIG. 6, whereby it is automatically routed to the target via the system 10 with the originator only having to dial the target phone number and initiate the message transmission. The system 10 finds the LSO 22 that has contact with the target user in its coverage area by matching the identification codes stored in the network LSO's with the target phone number. The controlling RSP 23 of the LSOs also maintains the SU user location and user identification information in its database and performs the conversions necessary for matching the IDs with the target phone number dialed. The LSO's, however, may perform the phone number and ID conversions before responding to whether they have the target device and user in their coverage area. The LSO and RSP may also decide whether the SU 50–69 is compatible for receiving the type of message being transmitted based on the SU device ID. In other words, either the LSO's or RSP's, or both, maintain databases and intelligent processors for temporarily storing the user identification, device identification and location information relevant to RSUs 50 currently active in the corresponding network.

For locating RSUs that are within a particular network, it is preferred that they be enabled with enough power to allow the transmission of the beacon ID's identifying the device and user. Thus, it may only be necessary for the modem of the RSU 50 device to be powered. Therefore, the RSU 50 does not necessarily require full power to respond to cellular radio or WAN network system ID broadcasts or to respond when its own ID is being called for the delivery of a message.

Referring to FIGS. 5, 5A and 7–9, the instant invention 10 has four possible modes of operation, a normal flow where the target is found, a normal flow where the target is not found, normal flow where there are multiple "found" active locations and normal flow with multiple prior locations. The present discussion references a RSU target, but the four modes also apply to wireline SUs. The only thing that changes between RSUs and WSUs is the physical network link over which ID data and messages are transmitted. In a normal operation, in order to send a message so that it finds the target user, the target RSU must be enabled, but not necessarily logged onto the network, such that when the message is sent it finds the user's target RSU 50. The first five steps are foundational procedures which are repeated when attempting to send a message and find a target. The method broadens when the target is not found. In the first step, seen in FIG. 7, as a target user travels within a WAN, such as position 50c in WAN 20, if the modem is enabled the target device 50 responds to MTSO 70b broadcasts identifying the particular MTSO. In return, the target device or RSU 50, identifies itself with ESN and/or MIN number beacons on the control channel 54. In addition, the RSU 50 preferably transmits the user's identification (UID) and the present location over the control channel 54 so both the user and target devices may be contacted. In addition, the instant invention transmits a target device identifying code so the form of the message can be adapted, such as an E-mail or fax, to the device. It should be noted that the MTSO 70b may comprise a conventional switching office, as discussed in the background art, for communicating with the RSU 50. The MTSO 70b is defined by the physical network 70 which further defines the transceiver devices 70a and the communication links. The instant invention provides LSOs 21–46 which are adapted for communicating with the MTSO. When a target user and RSU 50 are located by the MTSO 70b of the physical network 70 the controlling LSO 22 of the control exchange area is updated with the user and RSU ID's and location. The LSO 22, or the controlling target LSO, records the location of the target user and the target device identification information. The target LSO 22 does not propagate this information to any other network element such as to the controlling RSP 25, until the RSU 50 logs on to the network or until a request is made by the controlling RSP 25 or a peer RSP 34, 47 via RSP 25. In the case where the modem of a target RSU 50 is not enabled, nothing happens and the LSO is not made aware of the target RSU 50 or the modem's enabled presence in the exchange area because no ID's are being transmitted.

"Log-on" is a user initiated event as compared to the user's device passively monitoring the network; or the user's device actively "registering" itself as it passes through various cells or WANs. A user logs on the network to either send a message, or to receive messages stored in the message box 35 (for which they might have been notified earlier). Log-on entails user authentication, possible security measures such as enabling encryption code, etc. (depending on the devices capabilities) and initiating service request (depending on the user's class of service authorized).

In the second phase, when the RSU 50 user logs on to the current network, the device, location and user ID's are transmitted to the controlling LSO 22 which notifies its controlling RSP 25. The controlling RSP 25 updates the target user's message box with the current location and device identifiers via the home RSP 34. A time stamp may be provided by the controlling LSO 22 or by the message box when the update is received from the home RSP 34. The message box 35 may therefore have an internal clock to provide the time stamps. This update is always done as soon as possible, but is not necessarily of highest priority since it is merely an administrative update. Current target searches, message routing and other RSU operations may take priority. Typically, the RSU 50 is already performing a task, activity or function when logging on, such as a phone call or air-link fax. In these instances, the RSU 50 updates the message box 35 with location information via the controlling LSO 22 and RSP 25 during either dead time or simultaneously in a parallel or multi-tasking operating function. In any event, once the controlling LSO 22 and RSP 25 receives the user, device and location information, the message box 35 is almost simultaneously updated with the location of its corresponding RSU 50 and user with a time-stamp corresponding to the location time. The RSP 25 transmits and updates the target user's message box 35 at the user's home location, shown as WAN 30.

The RSU 50 communicates with the most proximal or closest LSO, that is, LSO 22, when the RSU is at location 50C, as shown in FIG. 5. The LSO 22 notifies and updates the WAN field controlling RSP 25 with the RSU transmitted data. The RSP 25 transfers the device, user and location data to RSP 34, that is the home RSP, which updates the user's corresponding message box 35 with the target user's current location. The LSO's 21–46 also store information in their database regarding local registered user locations and ID's. The corresponding message box 35 is always updated with the RSU or subscriber location as soon as possible subsequent to "log-on" and when that position, or location, changes.

In the third step if the target user does not log on to the network and an originating subscriber unit, SU 60, wants to transmit a message, then the originator transmits or sends the message to the subscriber or user's own home LSO 21 or to the most local LSO. The originating subscriber unit 60 is linked by the physical network to its originating LSO 21 via transceiver 70a but it may be directly linked as well. Subsequent to sending the message to the home LSO 21 of the originator, the LSO 21 searches its own database to ascertain whether the target user is within its exchange. If the LSO 21 has the target user then it routes the message to the user's target device 50 (if the device can be contacted). If the target RSU 50 or user cannot be contacted, then the originating message is routed to the target user's message box 35. It is important to note that at this point the originator does not have to perform any other functions to have their message routed to the user or the user's message box 35. The originator is done and the message will find the target user without the target user having to check their own message box 35. If the target and originator are operating from the same LSO, where that LSO is the target's home LSO, then the message, whether voice or date, may be directly dumped into the message box 35. If the originator's LSO 21 does not have the intended target user then it will request the location of the user from its controlling RSP 25 (which is the same as the target user's controlling RSP in FIGS. 5 and 5A) which then sends out location requests specific to the target user.

In the fourth step, if the originating RSP 25 has the current target address stored in its data base, then it responds to the originator's home LSO 21 with the target user address, device and location information so that the message may be transmitted from the originator controlling LSO 21 to the LSO in control or contact with the target user or directly to the target user via the physical network in place. If the location of the target subscriber is unknown by the RSP 25, then it proceeds to obtain the last known location of the target user.

In the fifth step, the controlling RSP 25 does not have the requested target information, and the RSP 25 will begin at the process of obtaining the target user's most current location by asking the target RSUs home RSP 34 for the current location of the target user. The home RSP 34 address is known by the controlling RSP 25 based on the user or subscriber IDs and data originally transmitted. The home RSP 34 checks the user's message box 35 which is kept by one of the corresponding LSOs (LSO 31 in this case) for the current location of the subscriber. The home RSP 34 maintains a database of its registered subscribers and its home LSOs so that messages and location updates may be quickly retrieved from the LSOs and message boxes. The message box 35, LSO 31 and RSP 34 would forward the last known address of a subscriber to the requesting RSP, that is RSP 25 in this scenario. The originating or/controlling RSP 25 then uses this target user's last known RSP/LSO address (target user's location and address is based on the target's controlling RSP/LSO addresses since the controlling RSPs and LSOs if in contact with the target user has the actual airlink address stored in its database for establishing communicating links) to ask the target RSP 25 and target LSO 22 if the target RSU subscriber is still available in their network exchange. If so, the target RSP 25 responds affirmatively to the requesting RSP (in this case the target RSP and requesting RSP are the same in FIG. 5) and the originating LSO 21 transmits the message via the physical network to the target user and target device 50. In an alternative scheme, the message box 35 and home RSP/LSO may not have current information on the target subscriber. In this case the requesting/controlling RSP 25 may seek to obtain address location information from the peer RSPs. It is the preferred case that the message box 35, and/or home RSP/LSOs have a last known address of the subscriber whether or not that address is the current one.

In the sixth step, the originating RSP 25 through which the originator is attempting to route its message, tries to establish a communication link with the last known controlling RSP (which would be the same RSP 25 in this case) and the LSO 22 reported by the subscribers home message box 35, or a peer RSP 35 or 47, that supposedly has contact with the target user by asking whether that RSP 25 still has a link with the requisite target user and if the target device 50 modem is able to receive a message. Since the RSP 25, 35 and 47 of any network are updated anytime there is activity by the RSUs within its network, the RSP's within each network are essentially current on the location, device and user identification information. Therefore, the RSP 25 with the most probable link to the target user requests the target LSO 22 to respond with an indication of whether the user is still under its control and with user, location and device information. If the target user device is enabled and still under the LSOs control, the target LSO 22 responds back affirmatively to its controlling RSP 25, or target RSP 25. The controlling/target RSP 25 responds back affirmatively to the originating RSP (the RSPs are the same in FIG. 5) with the location, target user and target device information, that is, if the RSP's are different. If the RSP's are the same then it is not necessary. Afterwards, the originating LSO 21 may send the message to the target subscriber through the physical network, i.e. MTSO 70b and transceiver 70a. Otherwise, the message is routed to the target user's message box 34 if such a class of service is allowed.

In a seventh step, the RSP 25 nearest the target user updates the target user's home message box 35, the target's home RSP 34 and the originating RSP. The originating RSP updates the originating LSO with the information on the target user and device. The originating RSP updates the originating LSO with the address, device and user information so the message may be sent to the target user. The originating RSP and LSO temporarily store the target data in their database for subsequent transmissions.

For ease of following the foregoing order of steps in the method and operation of the instant invention 10 the originating device may be changed to RSU 62 in WAN 40. In this case, the originating LSO is LSO 42 and the controlling/originating RSP is RSP 47; the target LSO is LSO 22 and the target LSO's 22 controlling RSP is RSP 25 which is also referenced as the target RSP; and the home RSP is RSP 34 and the home LSO is LSO 31. Thus, an originating device, such as RSU 62 in FIG. 5, tries to establish a communication link with a target deride, such as RSU 50, via the physical network 70 which would comprise the closest transceiver tower 70a and MTSO 70b, or a similar servicing office. In the event that the originating RSU 62 is unable to establish a communication link with the target RSU 50, the originating RSU 62 still has the option of transmitting a message to the target message box for later retrieval by the target subscriber. This, however, may be invisible to the originator. To transmit a message, the originating device, or originator 62, merely dials the phone number of the target subscriber. The events which follow to actually transmit the message are conducted without any further originator interaction. Once the message has been successfully routed or stored in the target subscriber's message box the originator may receive a confirming message or signal. If a location or address of the target is not known, then the originating LSO 42 initiates the first five steps as noted above. Thus, the originating LSO 42 requests target device, user and location information from its controlling RSP 47. If the originating/controlling RSP 47 does not have the address location of the target user in its database then it seeks the location from the target RSUs 50 "home RSP 34". The home RSP 34 subsequently checks the target user's message box 35 via the corresponding LSO 31 for the current location of the target subscriber. The last known address of the target user is pulled from the message box 35 and forwarded through the home LSO 31 and home RSP 34 back to the requesting/controlling RSP 47. The originating/controlling LSO 42 then uses this target RSP/LSO 25/22 address to ask the target RSP/LSO 25/22 if the target RSU subscriber is still available their network. If so, the target RSP 25 responds in the affirmative, and the originating LSO 42 transmits the message. Otherwise, the controlling RSP 47 asks the peer RSPs whether the target user is in their network exchange.

The next or second possible sequence of events includes a normal flow where the target user is not found. In the normal flow of events where a target user is not found, the initial five steps as noted above are still followed. This discussion will reference RSU 62 as the originating device. That is, a target RSU device 50 responds to broadcasts from the controlling network MTSO 70b (or any physical network system 70) identifying itself and its location which is stored in the corresponding LSO 22. In addition, once the target device is used the target/controlling RSP 25 of the target LSO 21 and home message box 34 is updated with the target user information. Also, as before, if an originator 62 wants to route a message to a target user 50 it dials the "phone" number and sends its message. The originating LSO 42 then searches its database for the target user information. If it is unavailable, the originating LSO 42 requests the controlling/originating RSP 47 for the data and RSP 47 searches its database for the target user information. If the originating RSP 47 does not have the target data in its database, then it asks the target's home RSP 34 which checks the target user's message box 35 for the last known location of the target user. Note, the message box 35 is constantly updated with the last LSO and RSP to have control of the target. Once determining the last known LSO location, such as LSO 32 at positions 50b, as provided by the message box 35, the home RSP 34 notifies the originating RSP 47 which notifies originating LSO 42. LSO 42 then contacts the target/controlling RSP, if different from the home or originating RSP, with the target's last known LSO, i.e. LSO 32, to see if LSO 32 still has control of the target. After the originating LSO 42 notifies the last known target RSP 34 that it is searching for the target user and user device, the last target RSP 34 searches its database to determine if the controlling target LSO 32 still has the target and/or asks the last target LSO 32.

In this second scenario the target 50 is not found because the controlling target LSO 32 no longer has the target user. Therefore, as in the sixth step the target LSO 32 responds that the target user ID cannot be located (the modem may be off) and provides the last time-stamp indicating when the target user RSU modem was last enabled or when the target left the region. This time-stamp is sent to the target RSP 34 which then broadcasts a local search request to the peer LSO's within the WAN 30 to determine if any of the peer LSO's within the RSP's 33 network are presently in control of the target user. If an LSO responds in the affirmative then the address of the target user and device information is sent to the originating RSP 47, LSO 42 and to the target user's message box 35 as in the previous step 6. This allows the message to be routed from the originating LSO 42 to the target user position 50b. If all responding LSO's 32–33 controlled by RSP 34 respond in the negative indicating that they do not or no longer have the target user in their coverage area, then the target RSP returns a "not found" response, the last known LSO location and a time-stamp of when the target user was last in communication. The target RSP 34 may also update the target users message box 35. Since the LSO's and RSP's for each WAN network are constantly being updated with last known locations and time-stamps, there may be a built in purging mechanism which is invoked after a predetermined amount of time or that is invoked by comparing time-stamps from other LSO's so that the LSO's and RSP's are not overloaded with endless strings of "not found IDs". Nonetheless, the LSO's and RSP's continue to maintain the last known location and time-stamp for some predetermined amount of time so that messages may be efficiently transmitted to either a target user's message box 35 or to a requesting RSP. In any event, after receiving the latest time-stamps from the LSO's and RSP's, the target RSP 34 sorts the "not found" messages, forwards the most recently known location to the originating RSP 47, LSO 42 and broadcasts the same message back to its own LSO's. This is again, a "not found" time update to all LSO's and RSP's except the one that has already reported a "not found" with the latest time-stamp. In step seven of the second sequence, after the "not found" response, the originating RSP 47 broadcasts a message to all its peer RSP's searching for the target user. The peer RSPs respond with ACK's and may respond with the last location and time-stamp if a previous connection was made. The originating RSP 47 collects all these responses, looks for an active answer giving a last address which if given is sent with the target user's device information and time-stamp to the user's message box 35. If there is an active response, then the originating RSP 47 notifies the originating LSO 42 which attempts to transmit to the target RSP 25 and LSO 22. If there are no active responses identifying the last known location and time stamp of the target user or the target RSP 25 responds with a "not active" response, then the originating RSP 47 informs the originating LSO 42 and the target user's message box 35 with a time-stamp of the search.

The third sequence of events constitutes a normal flow where there are multiple found active locations. This is a misconception, in that, it is not possible to have multiple active locations since a RSU's modem can only be in session with one LSO at a time by the design.

In the fourth sequence of the method of the instant invention 10, multiple responses may be received by the requesting RSP identifying different locations and time stamps of when a target user was last known to be active in a LSO's area. In this sequence of events, the above six steps are again followed. That is, the RSU 50 target user registers with the closest LSO and RSP when it logs on. Again, at the same time, the target user's message box 35 is updated with the location and a time stamp identifying the time at the noted location. Again, an originator 62 is desirous of transmitting a message to a target user 50. Therefore, the originator sends a message to its home LSO 47 which searches its local database to determine whether the target user is within its exchange. If so, the message is routed to the target user 50. However, if not, and the current route is unknown, then the originating LSO 42 asks the controlling/originating RSP 47 whether the target user is presently owned by another LSO within the network. If the controlling/ originating RSP 47 has the address location of the target user, which could be LSO 41 in FIG. 5 if the target was SU 64, then it responds to the originating LSO 21 which is then able to transmit the message to the target user. If not, the originating RSP 47 the target user's home RSP 34 which checks the home LSO 31 for the most current location of the target user. The home LSO 31 obtains this information from the target user's message box 35. The home RSP 35 returns this location to the originating RSP 47. The originating RSP 47 then establishes a communication link with the most recent controlling RSP and LSO address to see if they presently have contact with the target user. If a target LSO 22 responds back to the RSP 25 in the affirmative then the RSP 25 returns the location of the target user to the originating RSP 47 and LSO 42 which initiates transmission. Otherwise, the target RSP 25 may conduct a local WAN search of its LSOs. If the LSOs respond that the target user is not currently active, "not found" response, within the network then it informs the originating RSP 47. The originating RSP 47 then conducts a peer wide search.

It is possible that more than one affirmative response may be received by the originating RSP 47 identifying last known locations for the target user. This last scenario covers multiple affirmative responses from peer RSP's and LSO's that at one time had control of the RSU target user. Since it is possible that multiple prior locations may be reported to the originating RSP 47, the originating RSP 47 sorts through the responses received by the peer RSP's comparing timestamps. At the same time the originating RSP 47 reports "not-found" to the originating LSO 42 and to the target user's home RSP 34. The home RSP 34 updates the target user's message box 34 with a "not found", and the "last known" location and time-stamp of the user. Thus, the originating RSP 47 merely finds the latest time-stamp and location so future requests may refer to that last location. In this way, the most recent location and time stamp are stored in the message box 35 and the rest are discarded for waste management, storage maintenance and for more efficient connections.

It should be noted that the originating RSP 47 in control of the originating LSO 42 may refer directly to the message box 35 of the target user for the last known location and time stamp of the target user before asking the peer RSP's. In this way, the originating RSP 47 may go to the last known network of the target user and request the required information from that RSP. If the target RSP responds in the negative then the originating RSP 47 may then seek the location and time-stamp information regarding the target user from other peer networks. The originating RSP 23, however, usually first asks the peer RSP's 33 and 43 for a target is at worse two links removed from the target user. That is, if an originating RSP does not have the target user and a peer RSP does, then there is an LSO directly linked to the peer RSP that is in control of the target user.

Accordingly, assuming a mesh routing network as intended by the instant invention, between the peer RSP's, all peers are merely one hop or link away for message transmissions and information requests. For short messages like "find", the RSP responses relating to whether or not the target user has been found occurs in almost real time. Broadcasting is also fast since the home LSO is only two hops away if the RSP networks are fully meshed. This therefore supports virtually instantaneous real time LSO and message box updates and housekeeping at the peer LSO's with the most recent time stamps.

Finally, in an alternative embodiment, the message box 35 could keep a short history of the most likely locations where a target user may be found based on probabilities calculated for the most recently found messages. This list may be referred to by an originating RSP to establish a request order when looking for the target. In addition, a hierarchy list may also be compiled based on a history of found locations. Moreover, all the LSO exchanges that RSUs pass through can instantaneously update their RSP's even if the RSU is not logged on. Therefore any broadcast requirements need only go to the peer RSP's for target user information, rather than down to the LSO's to find and determine the location of a target user.

The present logical network, like in the IBM® (registered trademark of International Business Machine®, Inc.) ICS™ network (trademark of International Business Machine, Inc.) has an auditing circuit and controlling software which identifies whether the end user RSU is merely a phone for communicating in voice or a message receiving device such as a facsimile machine, computer or pager. The network merely addresses the cellular or radio phone, or modem, so ultimately it doesn't matter who the actual end user is as it merely addresses the instrument once the user is found. However, it does track the user and identifies the type of device being used to determine what type or form of message, whether it be voice or data, can be received. Thus, when the originating LSO ultimately addresses the target RSU it determines if the target RSU user's device is a cellular phone, desk phone or lap top computer with a modem. Subsequently, the message can be sent in accordance with the end user device. The codes and addresses used for identifying RSUs should be universally designed or adapted for overall global network compatibility. Thus, if the RSU end user device is a computer with communication and video capabilities, the LSO's could identify this and transmit videos, E-mails or phone messages to the RSU. On the other hand, the LSO could identify that the RSU is a pager, and transmit an E-mail message one line at a time to the end user.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A system in a communication network for locating end users using a communication device so as to automatically route transmitted messages to a target end user from an originator end user, said system comprising:

means for independently locating target end users selected by an originator end user for receiving a communication message transmitted by the originator end user;

means for transmitting the communication message transmitted from the originator end user to the target end user independent of the originator end user activity and based on the location of the target end user as determined by said target end user locating means, said message transmitting means being in communication with said target end user locating means for ascertaining the location of the target end user to enable transmission of the communication message to the target end user;

means for automatically converting the communication message transmitted by the originator end user to a format compatible with the communication device being employed by the target end user; and means for automatically storing a location of the target end user as provided by said target end user locating means and the communication message transmitted by the originator end user for retrieval by said target end user locating means and the target end user, respectively, said automatic storing means being in communication with said target end user locating means and said communication message transmitting means.

2. A system as recited in claim 1, wherein said target end user locating means further comprises means for tracking end users locations to allow the transmission of communication messages from the originator end user to the target end user, said end user tracking means being in communication with said communication message transmitting means.

3. A system as recited in claim 2, wherein said end user tracking means comprises means for receiving and storing predetermined end user information originally provided by the end users to allow tracking of the end user's locations, said predetermined information receiving storing means being in communication with said communication message transmitting means and said automatic location and message storing means.

4. A system in a communication network for locating end users having a communication device for automatically routing transmitted messages to a target end user from an originator end user, said system comprising:

a plurality of area specific networks for receiving and directing messages transmitted from an originator end user in the communication network to a target end user, said area networks individually controlling message transmissions in a predetermined communication region, each said area network including a plurality of local storing means for receiving and storing predetermined information transmitted by an end user and messages transmitted by an originator end user, said local storing means for controlling and routing messages to a target end user selected by the originator end user;

a plurality of target end user locating means each individually defined by one of said area networks, said target end user locating means for locating target end users selected by the originator, each said target end user locating means being in communication with at least one other said target end user locating means and with said local storing means defined by the same said area network defining said target user locating means for receiving request to locate the selected target end user; and means for transmitting messages to the selected target end users, said transmitting means in communication with each of said local storing means for receiving messages to be routed from said local storing means to a specified target end user location and for transmitting messages to the selected target end user at the specified location.

5. A system as recited in claim 4, further comprising a physical communication network interconnecting each of said target end user locating means in a substantially meshed system, and for interconnecting said local storing means to said target end user locating means defined by the same said area network so as to selectively group said local storing means with individual said target end users for allowing direct communication.

6. A system as recited in claim 4, wherein said target end user locating means includes means for requesting local storing means to locate a selected target end user.

7. A system as recited in claim 6, further comprising means for matching a base identification number of a target end user dialed by the originator with an active predetermined identification code individual to the target end user, said identification number matching means being defined by each of said local storing means.

8. A system as recited in claim 7, further comprising a plurality of home location message boxes each individually in communication with preselected local storing means for storing predetermined end user information and transmitted messages that are not received by intended target end users.

9. A system as recited in claim 8, further comprising means for monitoring the location of target end users, said monitoring means defined by each of said area networks, said monitoring means being in communication with said home location message boxes for storing most recent known locations of the target end users owned by respective said home location message boxes.

10. A system in a communication network for locating communication end users having a communication device to allow the automatic routing of transmitted messages to a target end user from an originator end user, said system comprising:

a plurality of area specific networks for receiving and directing messages transmitted from an originator end user to a target end user in the communication network, said area networks individually controlling message transmissions in a pre-configured communication region, each of said area networks comprising a regional service point for controlling the flow of messages and information within said area network and for locating target end users, a plurality of local servicing offices each in individual communication with said regional service point for receiving search requests from said regional service point and for searching for requested target end users requested by said regional service point, said local servicing offices including means for routing messages to selected target end users and for temporarily storing messages intended for target end users;

means for interconnecting each of said area networks in communication for the transmission of messages and search requests between said area networks, said communication interconnecting means joining in communication said regional service points of other said area networks for placing said regional service points of each said area network in communication;

means for tracking the location of end users so as to allow the transmission of messages to end users when they are a target end user, said tracking means being defined by said regional service points and said local servicing office; and means for transmitting messages to target end users and for transmitting a predetermined end user information to said local servicing office wherein each of said local servicing offices controls communication in a preconfigured exchange.

11. A system as recited in claim 10, wherein each of said plurality of local servicing offices comprises a microprocessor, a database in communication with said microprocessor and means for communicating with said regional service point in control of the said local servicing offices wherein said means for communicating is in communication with said microprocessor.

12. A system as recited in claim 11, wherein each of said regional service points comprises a microprocessor, a database in communication with said microprocessor and means for communicating with said local servicing offices under the control of said regional service point and with peer regional service points in communication with the said regional service point.

13. A system as recited in claim 10, further comprising a means for transmitting messages between end users, said transmitting means being in communication with each of said local servicing offices and each of said regional service points, said transmitting means joining in communication said local servicing offices with each of said regional service points and said local service offices with said home location message boxes.

* * * * *